US011969812B2

(12) United States Patent
Ford et al.

(10) Patent No.: US 11,969,812 B2
(45) Date of Patent: Apr. 30, 2024

(54) AUTOMATIC GIN BLADE TRAINER AND METHOD OF USE

(71) Applicant: Ford Gin Services, Inc., Lubbock, TX (US)

(72) Inventors: Daniel Lloyd Ford, Lubbock, TX (US); Danny J Ford, Lubbock, TX (US)

(73) Assignee: Ford Gin Services LLC, Lubbock, TX (US)

( * ) Notice: Subject to any disclaimer, the term of this patent is extended or adjusted under 35 U.S.C. 154(b) by 126 days.

(21) Appl. No.: 17/808,099

(22) Filed: Jun. 21, 2022

(65) Prior Publication Data
US 2022/0402050 A1 Dec. 22, 2022

Related U.S. Application Data

(60) Provisional application No. 63/212,442, filed on Jun. 18, 2021.

(51) Int. Cl.
*B23D 59/00* (2006.01)
*G01B 7/31* (2006.01)
(52) U.S. Cl.
CPC .............. *B23D 59/002* (2013.01); *G01B 7/31* (2013.01)

(58) Field of Classification Search
CPC ............ B23D 59/002; G01B 7/31; B27B 5/34
See application file for complete search history.

(56) References Cited

U.S. PATENT DOCUMENTS

| | | | |
|---|---|---|---|
| 6,665,946 B1* | 12/2003 | Reilly | B23D 59/002 33/640 |
| 2005/0235794 A1* | 10/2005 | Ku | B23D 59/002 83/477.2 |
| 2007/0079682 A1* | 4/2007 | Hummel | B23D 59/002 83/522.11 |
| 2009/0313840 A1* | 12/2009 | Hughes | B23D 59/002 83/508.3 |
| 2015/0000493 A1* | 1/2015 | Boseman | B23D 45/066 83/473 |

* cited by examiner

*Primary Examiner* — Alvaro E Fortich
(74) *Attorney, Agent, or Firm* — Shannon Warren

(57) ABSTRACT

A training system comprises a training stand, a width, a length, a spacing measurement assembly, a training assembly, and a controller. each among a plurality of blade disks comprise a blade disk having a body portion, a center aperture, a diameter, a plurality of punched teeth, a sharpened edge, a center point, an outer edge and a center aperture diameter. portions of the plurality of blade disks comprises one or more misaligned disks and one or more nominal disks. The plurality of blade disks comprise at least a first disk and a last disk. each among the plurality of blade disks are attached to a mandrel along a center axis.

13 Claims, 29 Drawing Sheets

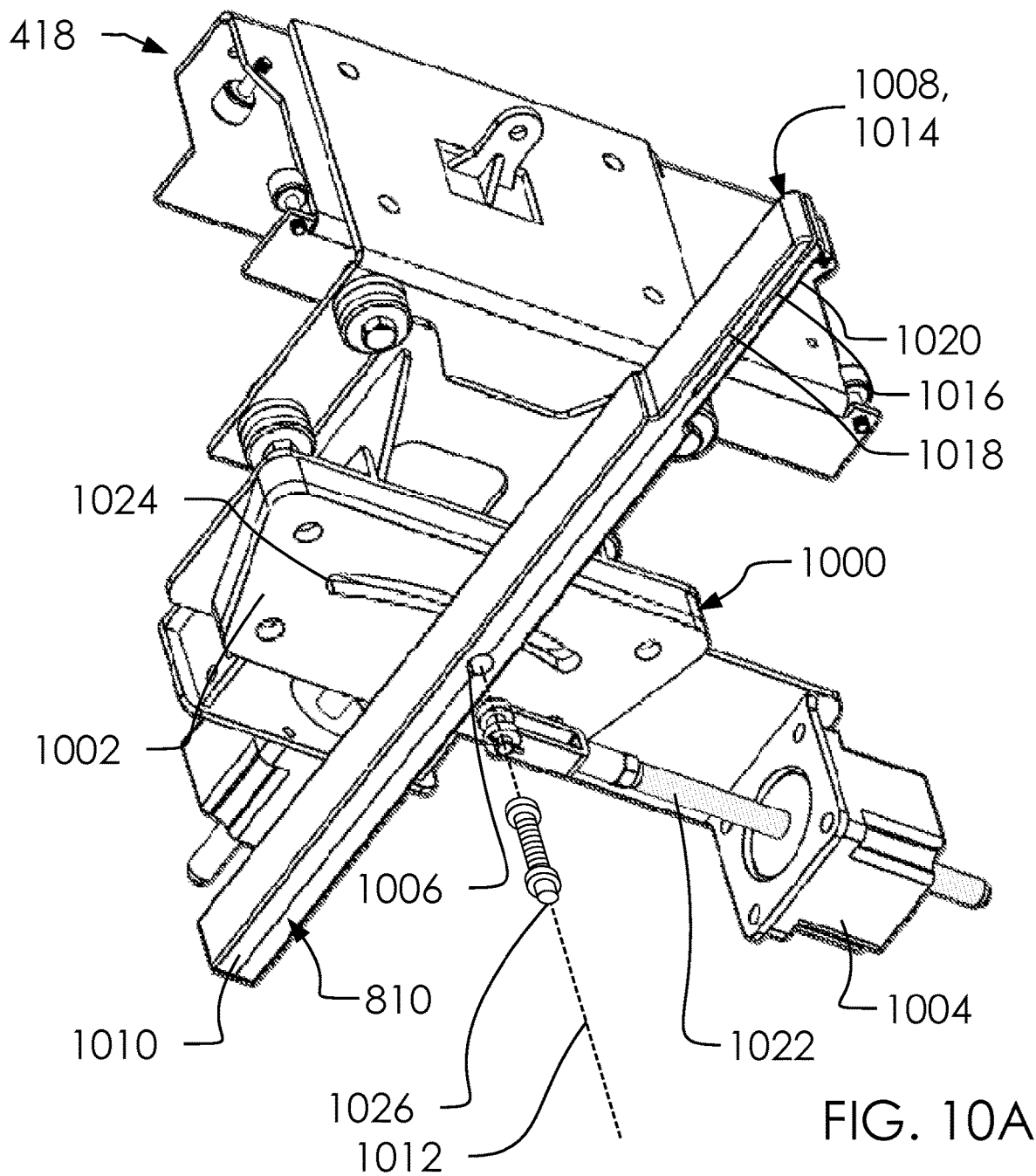
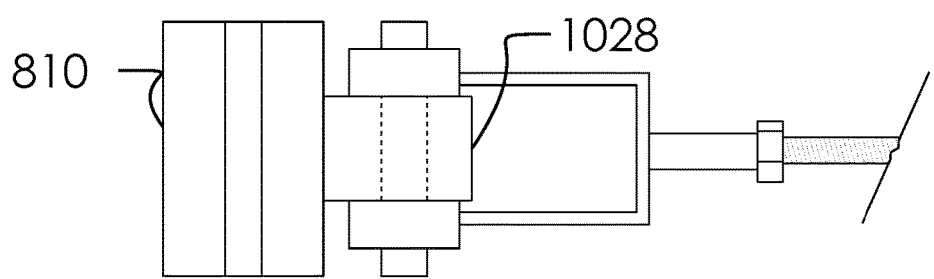
FIG. 10A
FIG. 10B

AUTOMATIC GIN BLADE TRAINER AND METHOD OF USE

CROSS-REFERENCE TO RELATED APPLICATIONS

This application claims benefit to U.S. provisional patent application No. 63/212,442 filed on Jun. 18, 2021.

STATEMENT REGARDING FEDERALLY SPONSORED RESEARCH OR DEVELOPMENT (IF APPLICABLE

Not applicable.

REFERENCE TO SEQUENCE LISTING, A TABLE, OR A COMPUTER PROGRAM LISTING COMPACT DISC APPENDIX (IF APPLICABLE

Not applicable.

BACKGROUND OF THE INVENTION

No prior art is known to the Applicant.

BRIEF SUMMARY OF THE INVENTION

A training system for identifying one or more misaligned disks among a plurality of blade disks and straightening said one or more misaligned disks. Said training system comprises a training stand, a width, a length, a spacing measurement assembly, a training assembly, and a controller. each among said plurality of blade disks comprise a blade disk having a body portion, a center aperture, a diameter, a plurality of punched teeth, a sharpened edge, a center point, an outer edge and a center aperture diameter. portions of said plurality of blade disks comprises said one or more misaligned disks and one or more nominal disks. Said plurality of blade disks comprise at least a first disk and a last disk. each among said plurality of blade disks are attached to a mandrel along a center axis. Said one or more nominal disks conform to a blade spacing specification comprising a total saw width between said first disk and said last disk comprises a specified saw width, and said outer edge of each disk among said plurality of blade disks are spaced by a specified separation distance. Said training stand is configured to hold said mandrel having said plurality of blade disks. Said one or more nominal disks among said plurality of blade disks each comprise said outer edge being said specified separation distance from said outer edge of adjacent disks. Said one or more misaligned disks among said plurality of blade disks each comprise a portion of said outer edge not being said specified separation distance from said outer edge of adjacent disks. Said controller, for each among said plurality of blade disks, is configured for receiving a measurement of a current separation distance of said outer edge between a current disk and an adjacent disk from said spacing measurement assembly, specifying whether said current disk comprises one among said one or more nominal disks or said one or more misaligned disks. if said current disk is among said one or more nominal disks, said controller is further configured for calculating a bend angle to alter said current disk to match said current separation distance to said specified separation distance of said blade spacing specification controlling said training assembly to correct said one or more misaligned disks according to said bend angle.

BRIEF DESCRIPTION OF THE SEVERAL VIEWS OF THE DRAWING

FIGS. 10A, and 10B illustrate a perspective bottom side view of said training assembly 418 and a elevated side view of a mounting plate 1002 with a training arm 810.

FIG. 13 illustrates a first front perspective overview of a second side height 414 without a motor 1200.

DETAILED DESCRIPTION OF THE INVENTION

The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1A:
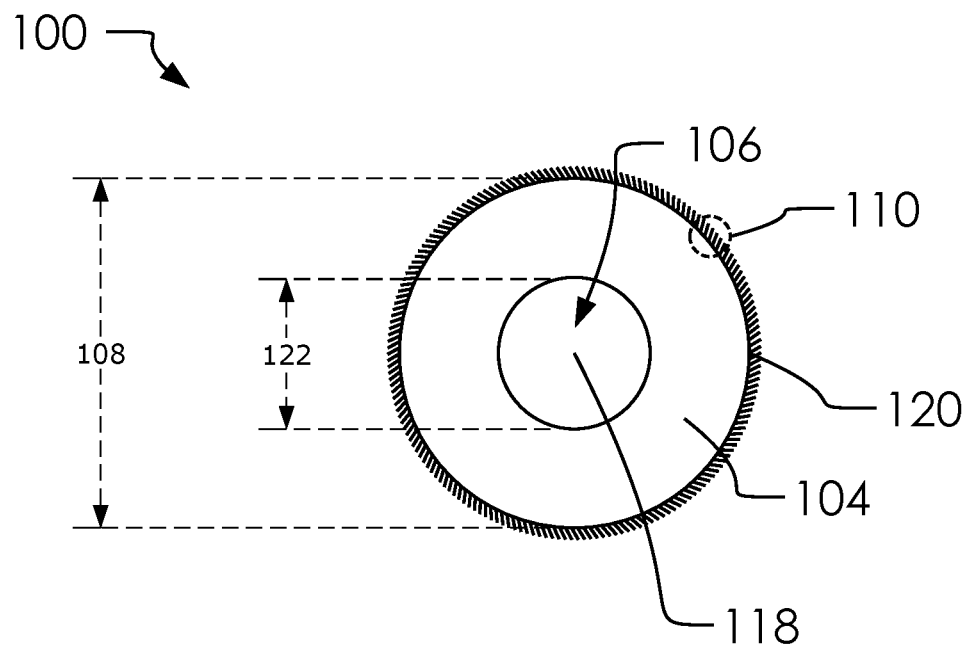
FIGS. 1A, and 1B illustrate an elevated top view of a blank 100 and a detailed elevated top view of a blade disk 102.
Figure 1B:
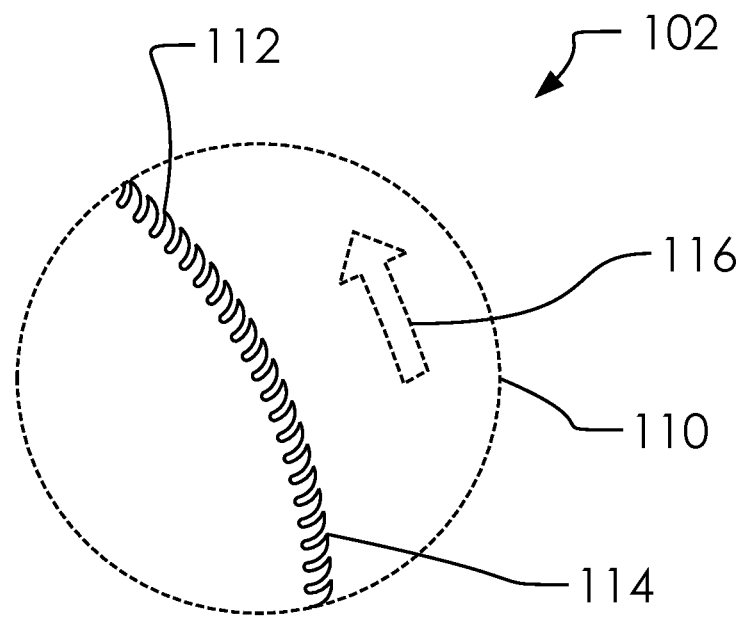

FIGS. 1A, and 1B illustrate an elevated top view of a blank 100 and a detailed elevated top view of a blade disk 102.

Said blank 100 can comprise an unpunched and unsharpened version of said blade disk 102, as described herein and known in the art.

Said blank 100 can comprise a round disc having a body portion 104, a center aperture 106, a diameter 108, and a center aperture diameter 122. Said body portion 104 can be a metal disk.

As shown in a detailed call-out 110 of said blade disk 102, said blank 100 can be punched to create a plurality of punched teeth 112 and a sharpened edge 114 (illustrated below). In one embodiment, said plurality of punched teeth 112 can be aligned in a tooth orientation 116 being relative to a center point 118 of said body portion 104 and on an outer edge 120 of said body portion 104.

Once punched said plurality of punched teeth 112 can be distributed evenly around said outer edge 120, as is known in the art.

In one embodiment, said blank 100 can be punched to add said plurality of punched teeth 112 to form an unsharpened punched blank 124, which needs to be sharpened as discussed below in order to create said blade disk 102.

Figure 2A:
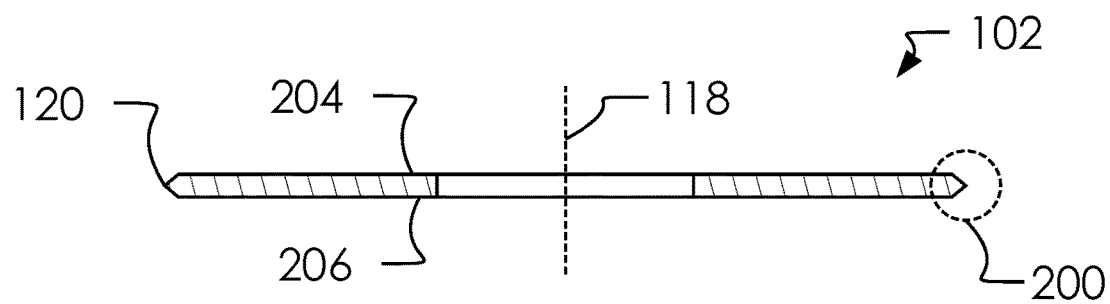
FIGS. 2A, and 2B illustrate an elevated cross-section side overview and detailed view of said blade disk 102.
Figure 2B:
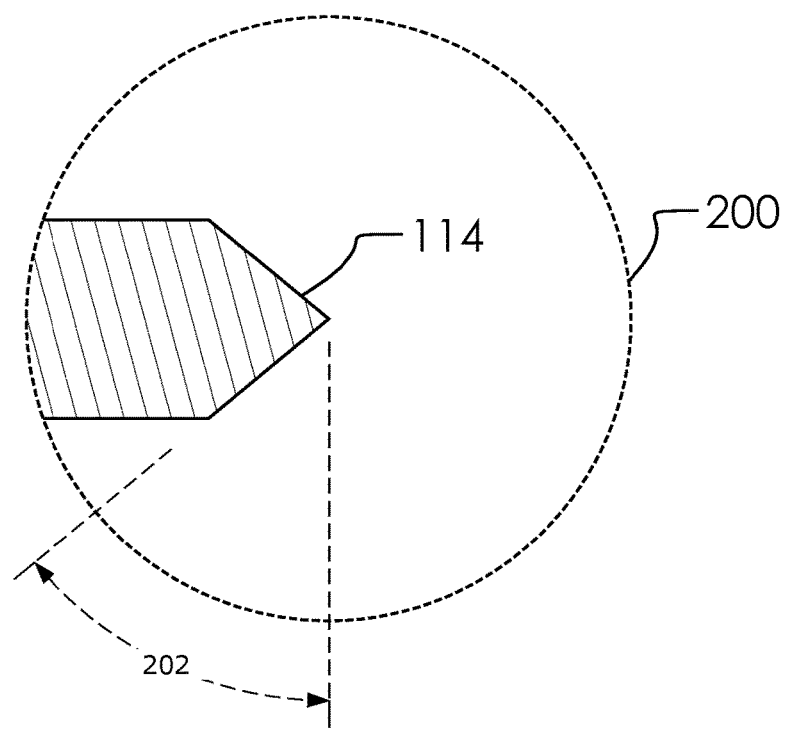

FIGS. 2A, and 2B illustrate an elevated cross-section side overview and detailed view of said blade disk 102.

As shown in a call-out 200, said outer edge 120 can be ground to said sharpened edge 114 at a grind angle 202.

Said blank 100 and said blade disk 102 can comprise a top surface 204 and a bottom surface 206.

Figure 3:
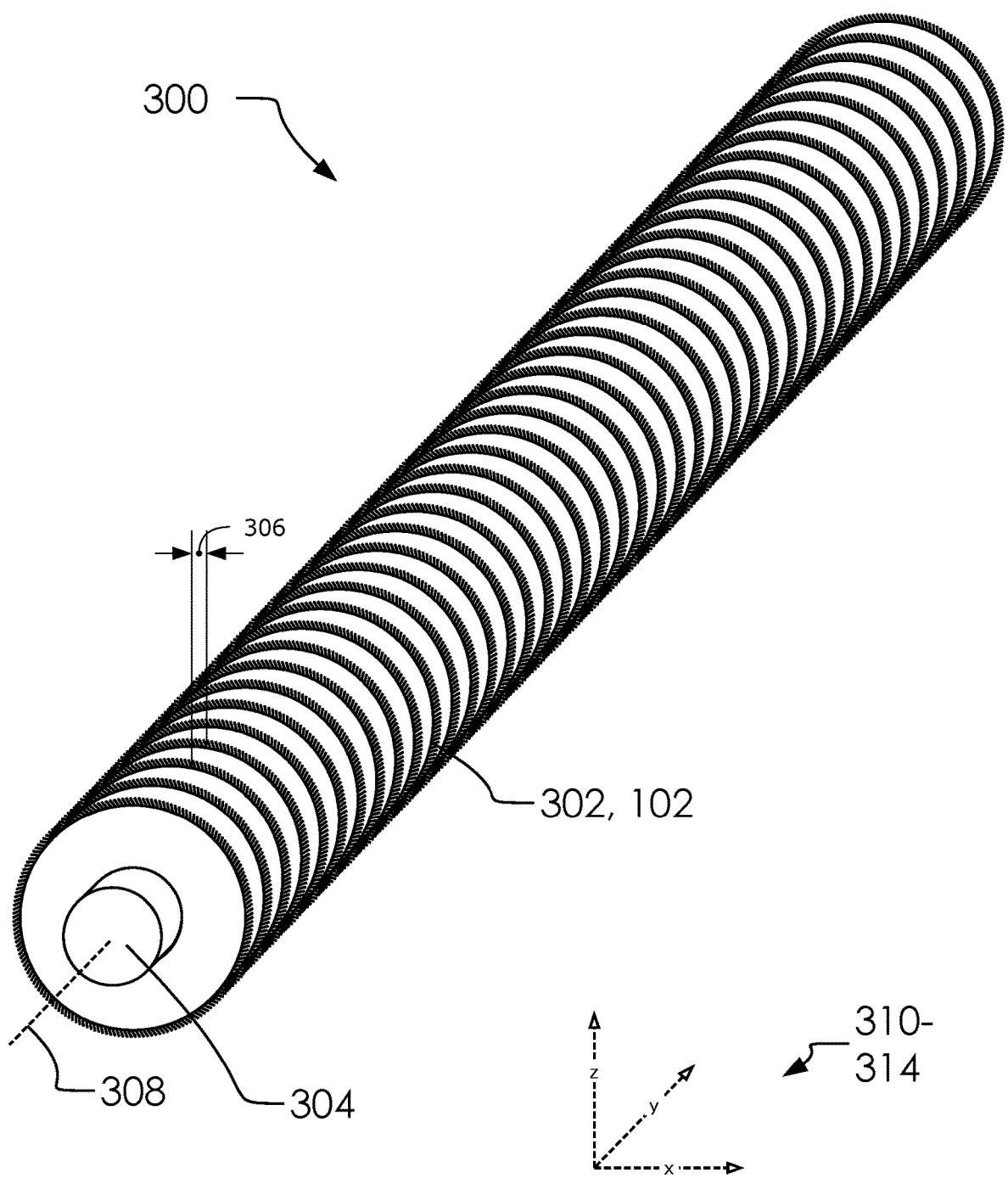
FIG. 3 illustrates a perspective overview of a mandrel 300.

FIG. 3 illustrates a perspective overview of a mandrel 300.

In one embodiment, said mandrel 300 can comprise a plurality of blade disks 302 attached to a center shaft 304. Each among said plurality of blade disks 302 can be separated by a specified separation distance 306 as measured along said center shaft 304.

Said center shaft 304 and said plurality of blade disks 302 can be aligned along a center axis 308. For reference, said center axis 308 is aligned along a y-axis 310, and each among said plurality of blade disks 302 are designed to be flat and aligned with both an x-axis 312 and a z-axis 314.

Said mandrel 300 comprising said plurality of blade disks 302 are a common feature of a cotton gin. Said mandrel 300 may be swapped in and out of a gin stand throughout the ginning process. As cotton is processed to separate lint from waste, said plurality of punched teeth 112 can become damaged, or one or more among said plurality of blade disks 302 can become bent such that said mandrel 300 will be removed and replaced. Process efficiency within a cotton gin is paramount to ensure profitability and safety in the industry.

During manufacturing, said mandrel 300 will need to be carefully constructed to ensure each among said plurality of blade disks 302 are planar within said x-axis 312 and said z-axis 314, and evenly spaced according to said specified separation distance 306.

Each said blade disk 102 among said plurality of blade disks 302 must fit within the ribs or gaps in the gin stand equipment, so care must be taken to ensure disks are straight and properly spaced to avoid jamming and equipment failure.

As is known in the industry, different equipment requires different specifications regarding said specified separation distance 306 and the quantity of said plurality of blade disks 302.

Current approaches to training said plurality of blade disks 302 include a manual process of training said blade disk 102 overseen by human operators, one blade at a time. In some prior art settings, electronic sensors may be used for measuring said specified separation distance 306 and a flatness of each among said plurality of blade disks 302. Accordingly, operators can bend disks to conform to expected standards.

Figure 4:
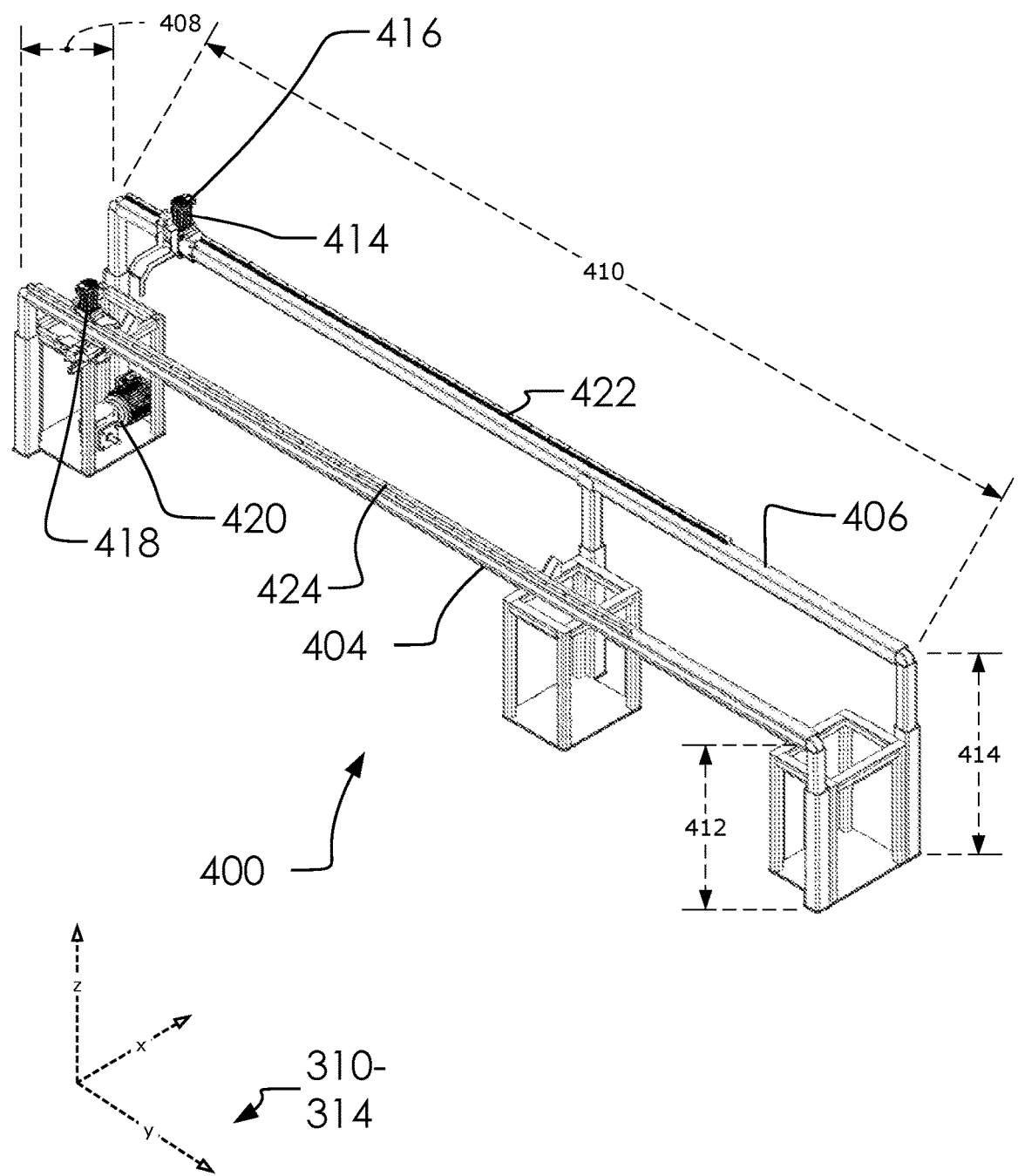
FIG. 4 illustrates a perspective overview of a training system 400.

FIG. 4 illustrates a perspective overview of a training system 400.

In one embodiment, said training system 400 can comprise a training stand 402 comprising a first side 404 and a second side 406. Said training system 400 can comprise a width 408, and a length 410. Said first side 404 can comprise a first side height 412, and said second side 406 can comprise a second side height 414. In one embodiment, said first side height 412 and said second side height 414 can be adjusted.

Said training system 400 can further comprise a spacing measurement assembly 416, a training assembly 418, a motor 420, a first track 422 and a second track 424. In one embodiment, said second side height 414 and said first track 422 can be attached to said second side 406, and said second track 424 and said training assembly 418 can be attached to said first side 404.

Said training system 400 can be configured to ensure each among said plurality of blade disks 302 are planar within said x-axis 312 and said z-axis 314, and evenly spaced according to said specified separation distance 306 by holding said mandrel 300 on said training stand 402, moving said spacing measurement assembly 416 and said training assembly 418 along said y-axis 310, measuring said specified separation distance 306 between said plurality of blade disks 302, and bending said plurality of blade disks 302 with said training assembly 418.

Figure 5:
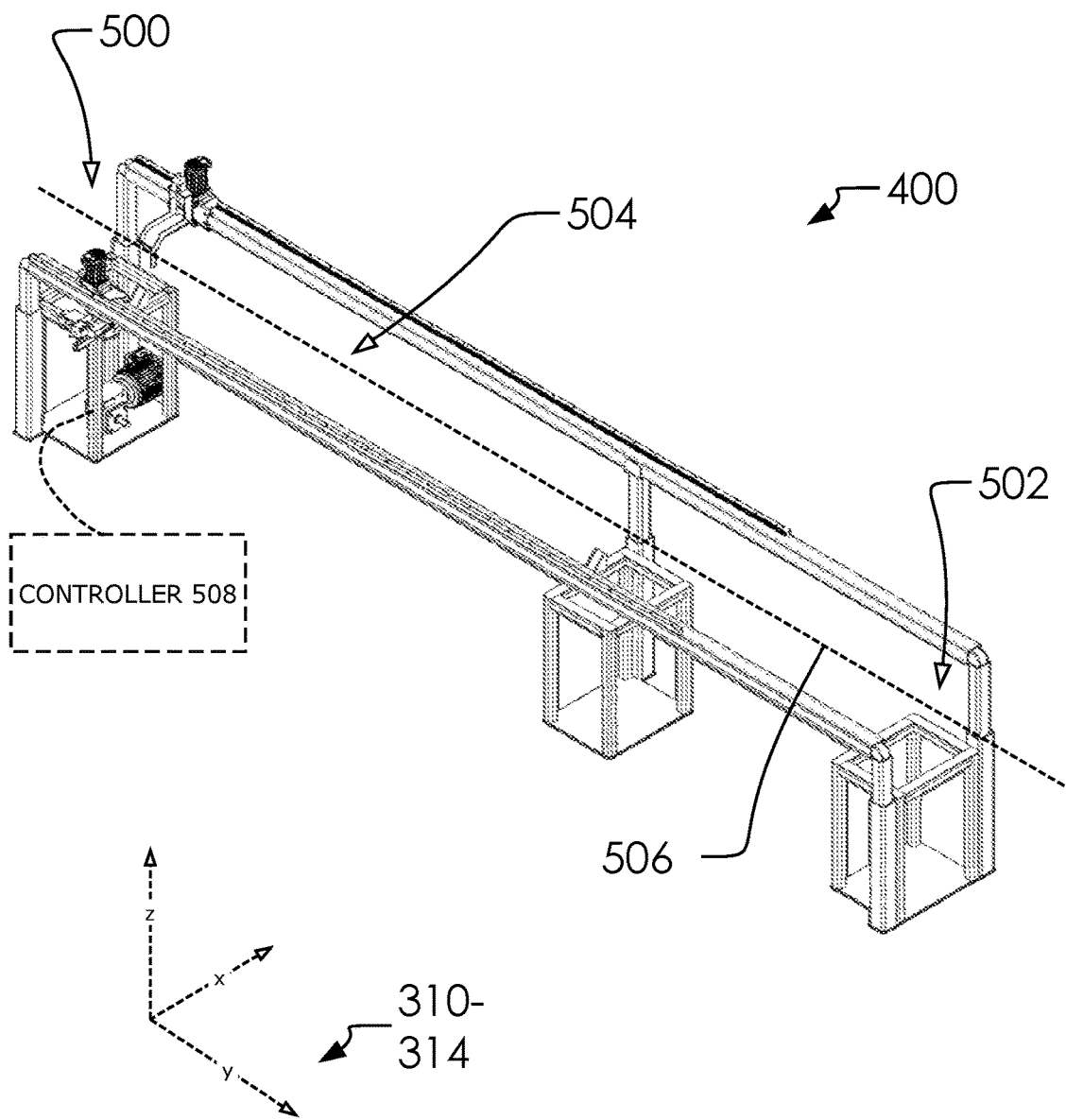
FIG. 5 illustrates a perspective overview of said training system 400.

FIG. 5 illustrates a perspective overview of said training system 400.

Said training system 400 comprises a first end 500 and a second end 502. Further, said training system 400 can comprise a central channel 504. In one embodiment, said mandrel 300 can be mounted between said first end 500 and said second end 502 within said central channel 504. Said central channel 504 can comprise a trainer rotating axis 506.

With said mandrel 300 installed into said training system 400, said center axis 308 and said center axis 506 can be aligned. Accordingly, said y-axis 310, said x-axis 312 and said z-axis 314 are applied to FIGS. 4 and 5 for reference.

Said training system 400 can comprise a controller 508 configured to monitor a state of said mandrel 300 and apply force to fix portions of said plurality of blade disks 302 according to a specification.

One advantage of said training system 400 can comprise productivity gains in training said mandrel 300. Initial testing shows a six fold productivity gain over human trainers. Said controller 508 can provide feedback and information during training.

Figure 6:
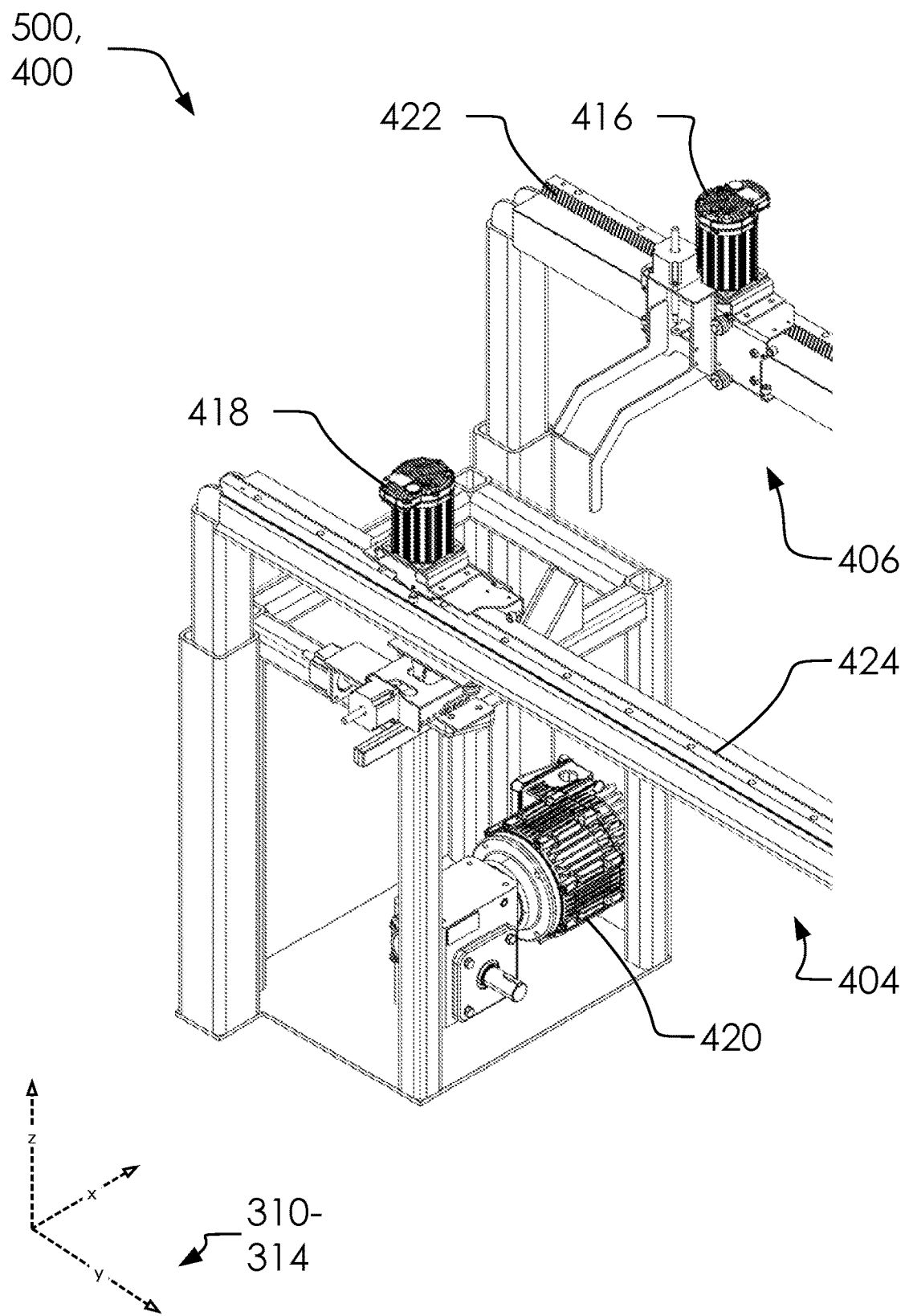
FIG. 6 illustrates a detailed perspective overview of a first end 500 of said training system 400.

FIG. 6 illustrates a detailed perspective overview of said first end 500 of said training system 400.

In one embodiment, said spacing measurement assembly 416 can comprise double sensor configured to read both sides of said blade disk 102 among said plurality of blade disks 302.

Figure 7:
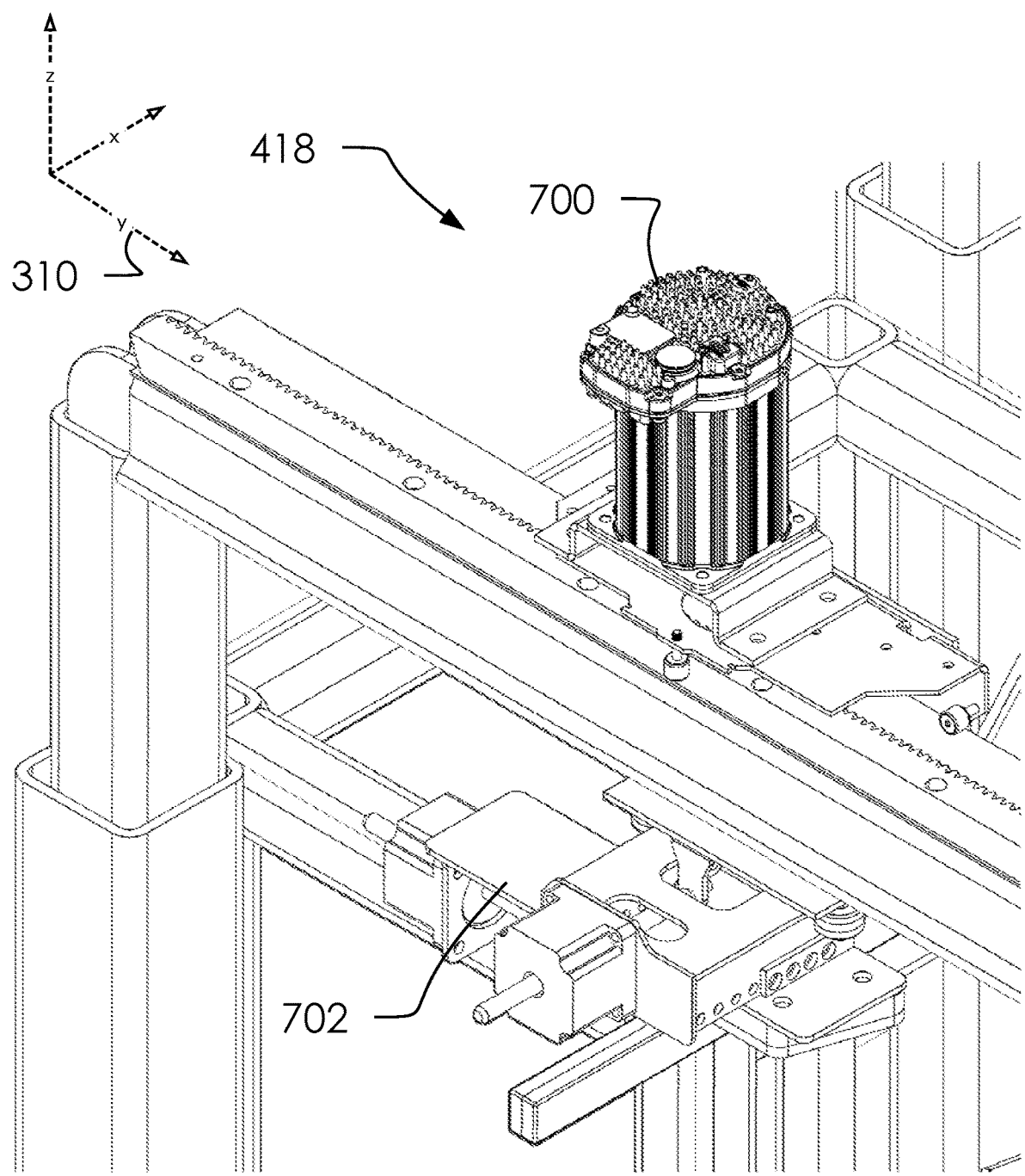
FIG. 7 illustrates a perspective overview of a training assembly 418.

FIG. 7 illustrates a perspective overview of said training assembly 418.

Said training assembly 418 can comprise a motor 700 and a linear slide assembly 702. A portion of said linear slide assembly 702 can move said training assembly 418 along said y-axis 310 using said second track 424.

Figure 8:
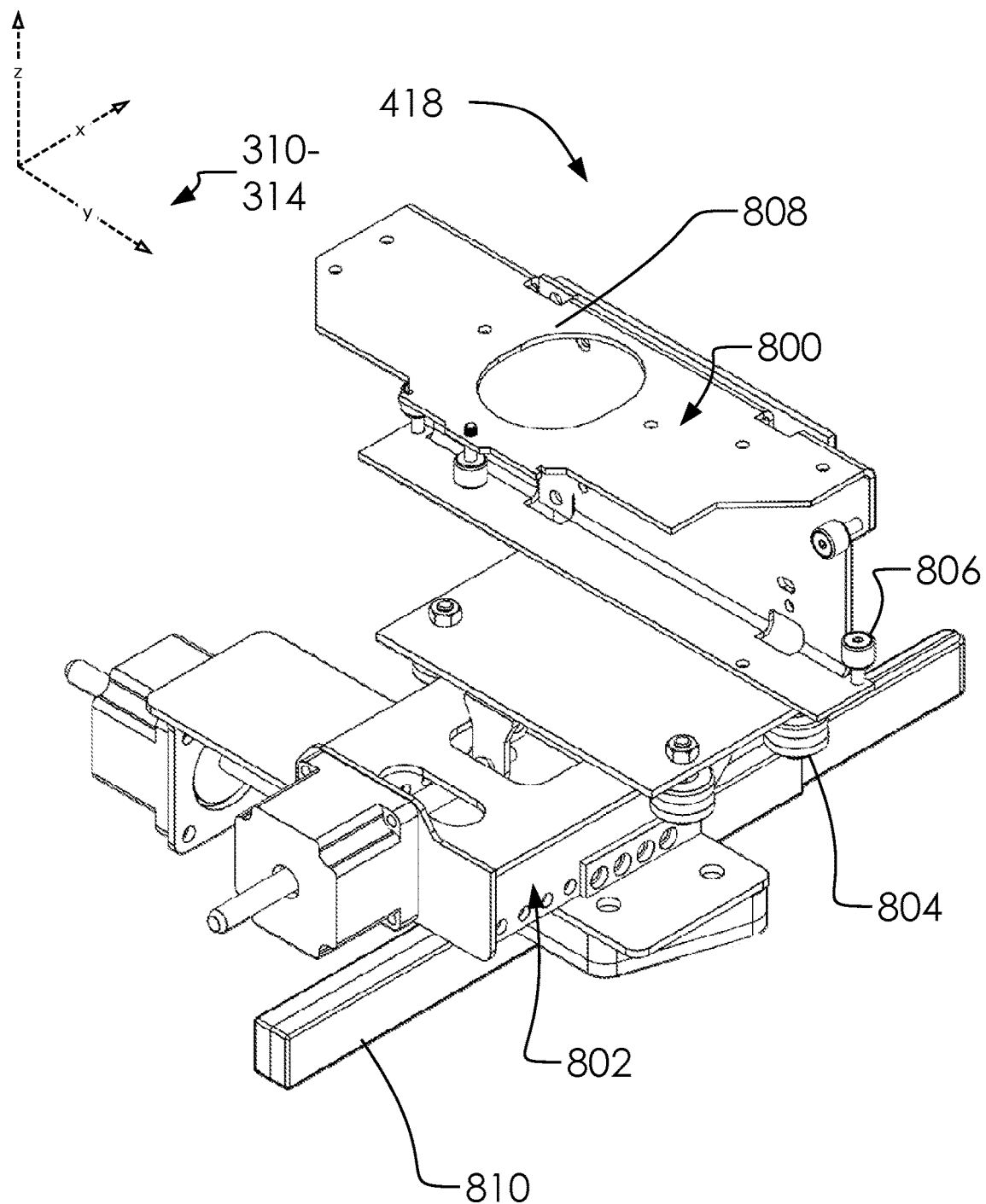
FIG. 8 illustrates a perspective overview of said training assembly 418.

FIG. 8 illustrates a perspective overview of said training assembly 418.

In one embodiment, said training assembly 418 can comprise an upper portion 800 and a lower portion 802. Said lower portion 802 and said upper portion 800 can move relative to one another in said x-axis 312 by applying pressure and rolling along a plurality of y-axis wheels 804. Likewise, said training assembly 418 can move along portions of said second track 424 using a plurality of x-axis wheels 806 for guidance.

In one embodiment, said motor 700 can attach to said training assembly 418 on a motor mount 808.

Said training assembly 418 further comprises a training arm 810.

Figure 9:
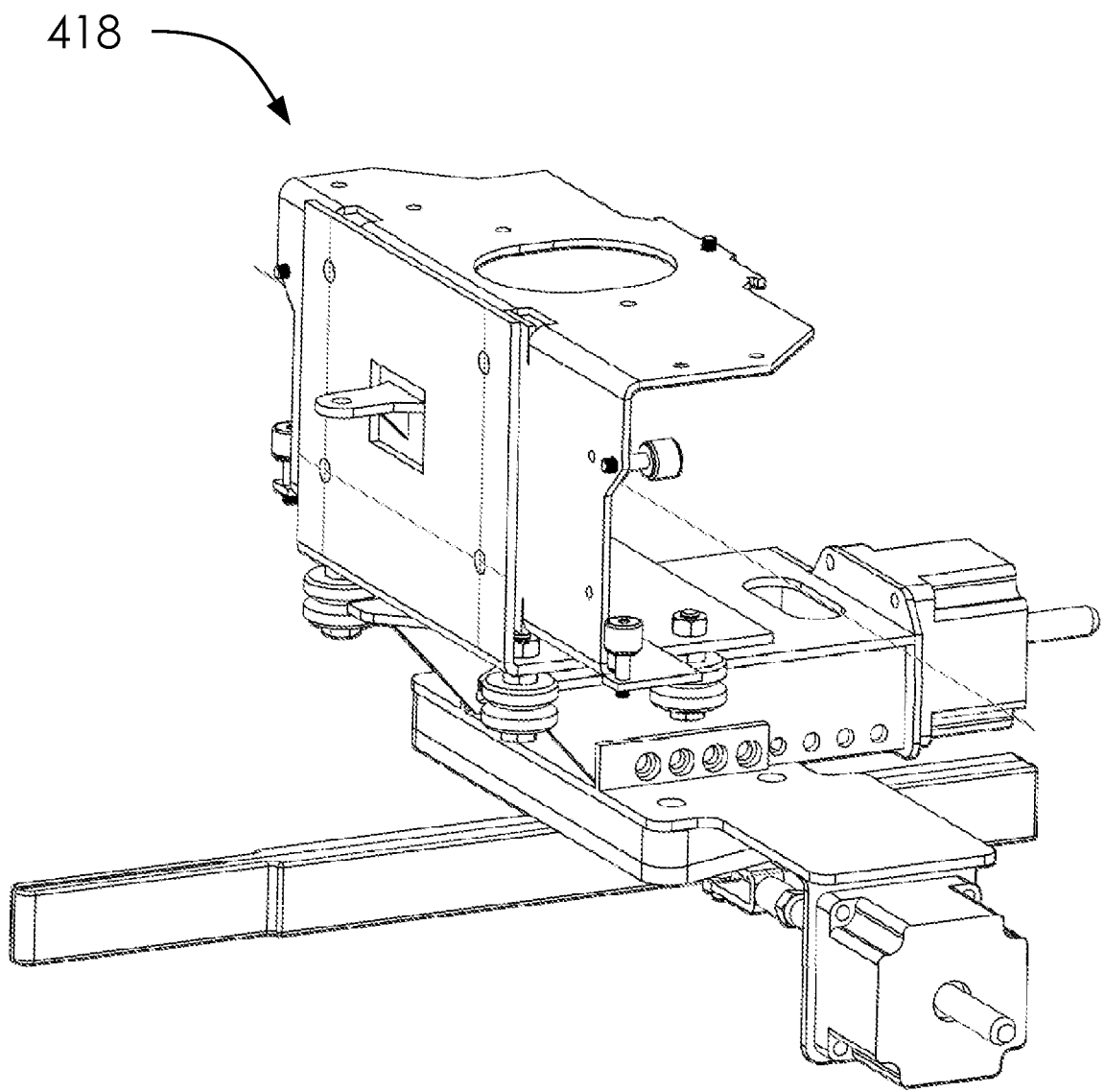
FIG. 9 illustrates a first perspective front side view of said training assembly 418.

FIG. 9 illustrates a first perspective front side view of said training assembly 418.

FIGS. 10A, and 10B illustrate a perspective bottom side view of said training assembly 418 and a elevated side view of a mounting plate 1002 with said training arm 810.

Said lower portion 802 of said training assembly 418 can comprise a bender mounting assembly 1000. Said bender mounting assembly 1000 can comprise said mounting plate 1002, and a linear actuator 1004. Said training arm 810 can comprise a fastener aperture 1006, a first end 1008, a second end 1010, a pivoting axis 1012, and a training adapter 1014.

In one embodiment, said training adapter 1014 can be attached to or integrated with said training arm 810 at said first end 1008. In one embodiment, said first end 1008 can be configured to point toward said central channel 504. Said training adapter 1014 can comprise a slot 1016 between a first side 1018 and a second side 1020.

In one embodiment, said slot 1016 can fit around a portion of said blade disk 102 of said plurality of blade disks 302, said linear actuator 1004 can push or pull said training arm 810, said training arm 810 can pivot around said pivoting axis 1012, and said slot 1016 can bend a portion of said blade disk 102.

Said linear actuator 1004 can comprise a rod 1022 configured to push and pull a portion of said training arm 810. In one embodiment, said training arm 810 can be pivotably attached to said lower portion 802 with a fastener 1026 through said fastener aperture 1006 and an arched aperture 1024 in said mounting plate 1002. In one embodiment, said fastener aperture 1006 can align with said pivoting axis 1012. Accordingly, said training arm 810 can be positioned according to pressure put on said training arm 810 with said rod 1022 by said linear actuator 1004, and pivoting about said pivoting axis 1012 through said fastener aperture 1006 and said arched aperture 1024.

In one embodiment, said training assembly 418 can adjust a portion of said plurality of blade disks 302 by: calculating a proper alignment of said plurality of blade disks 302, aligning said training adapter 1014 with one among said plurality of blade disks 302, activating said linear actuator 1004, moving said training arm 810 about said pivoting axis 1012, and bending a portion of said plurality of blade disks 302 according to a desired disk configuration.

Said arched aperture 1024 can comprise a portion of a circular path arching away from said central channel 504.

As illustrated in FIG. 10B, said training arm 810 can further comprise a side mounting bracket 1028. In one embodiment, a portion of said rod 1022 can attach to said side mounting bracket 1028 so as to allow said linear actuator 1004 to selectively push and pull said training arm 810 around said pivoting axis 1012.

Figure 11:
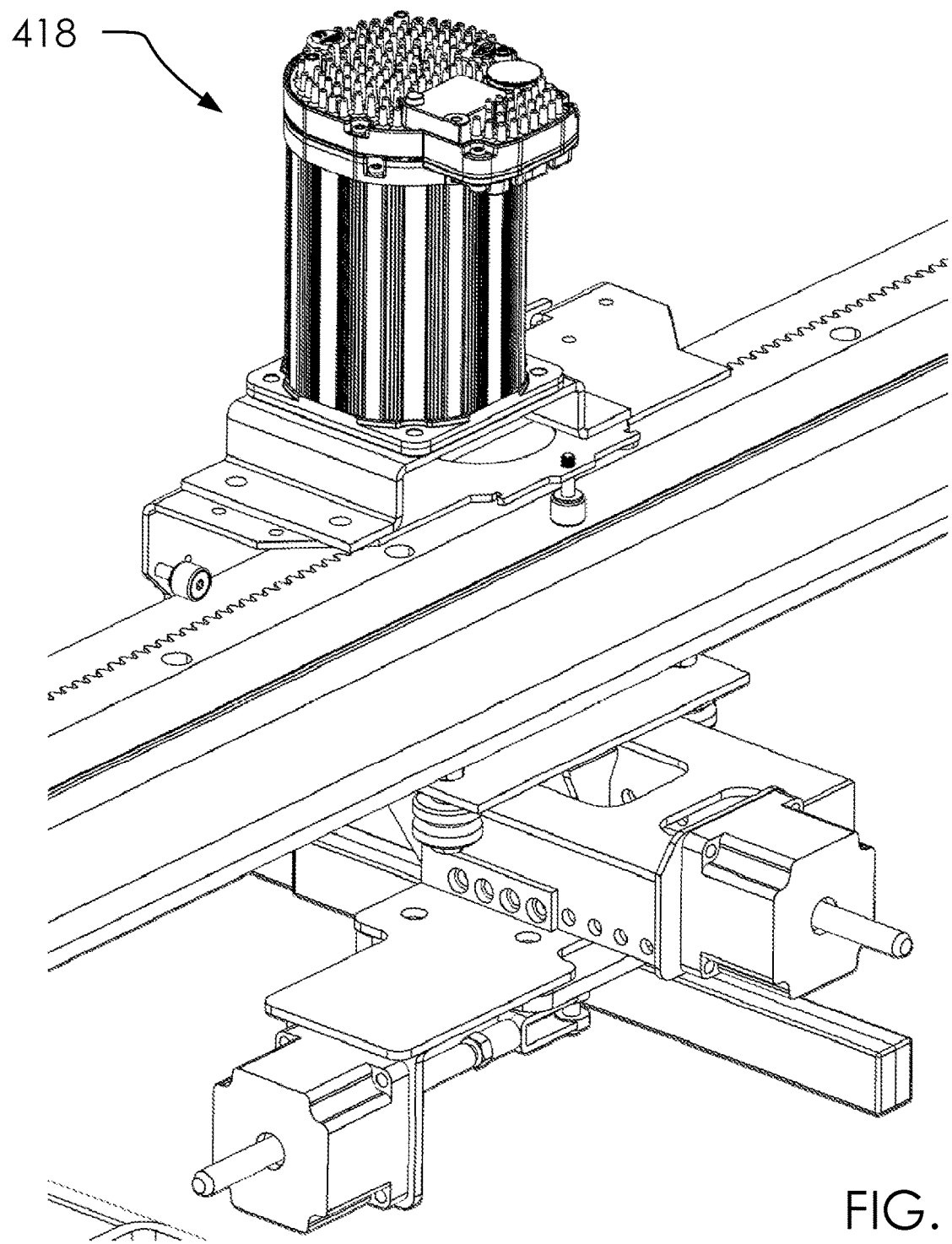
FIG. 11 illustrates a first perspective overview of said training assembly 418 attached to a second track 424.

FIG. 11 illustrates a first perspective overview of said training assembly 418 attached to said second track 424.

Figure 12:
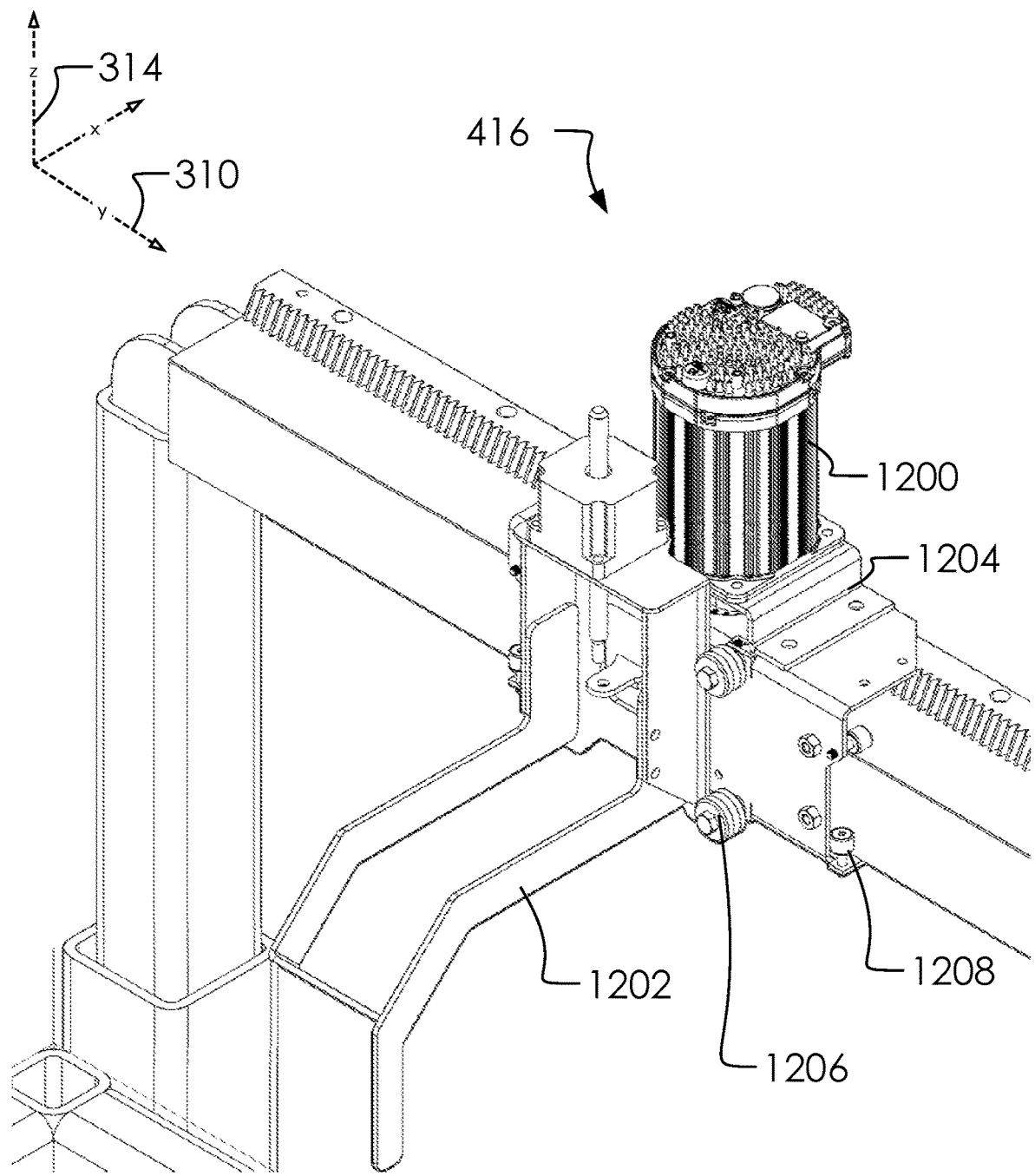
FIG. 12 illustrates a perspective overview of a spacing measurement assembly 416 attached to a first track 422.

FIG. 12 illustrates a perspective overview of said spacing measurement assembly 416 attached to said first track 422.

In one embodiment, said spacing measurement assembly 416 can comprise a motor 1200, a lower portion 1202 and an upper portion 1204.

In one embodiment, said lower portion 1202 can move in said z-axis 314 on a plurality of z-axis wheels 1206; and said spacing measurement assembly 416 can move in said y-axis 310 on a plurality of y-axis wheels 1208.

Figure 13:
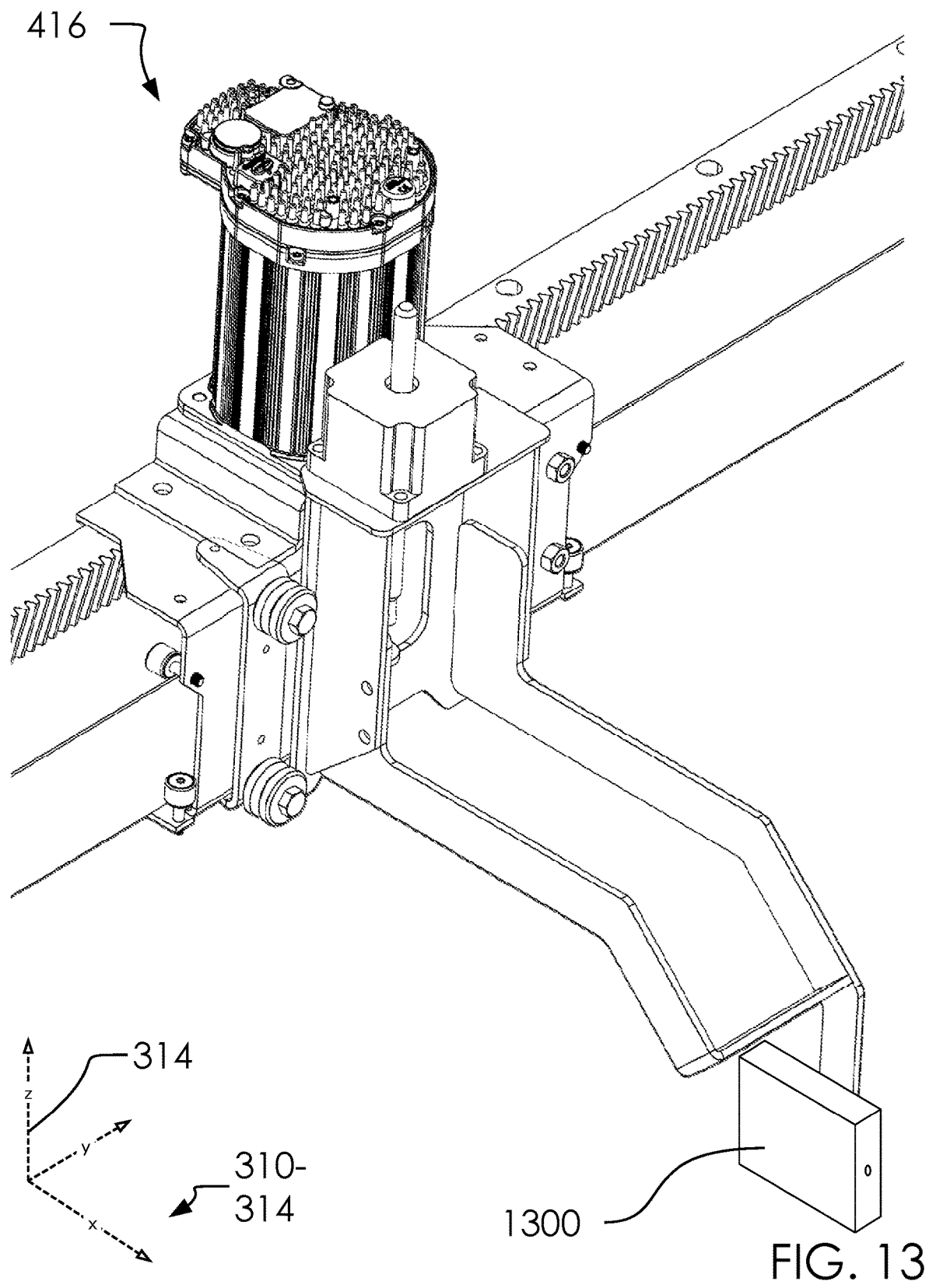
FIG. 13 illustrates a second perspective overview of said spacing measurement assembly 416 attached to said first track 422.

FIG. 13 illustrates a second perspective overview of said spacing measurement assembly 416 attached to said first track 422.

In one embodiment, said spacing measurement assembly 416 can further comprise a laser distance measurement system 1300.

FIG. 13 illustrates a first front perspective overview of said second side height 414 without said motor 1200.

Figure 14:
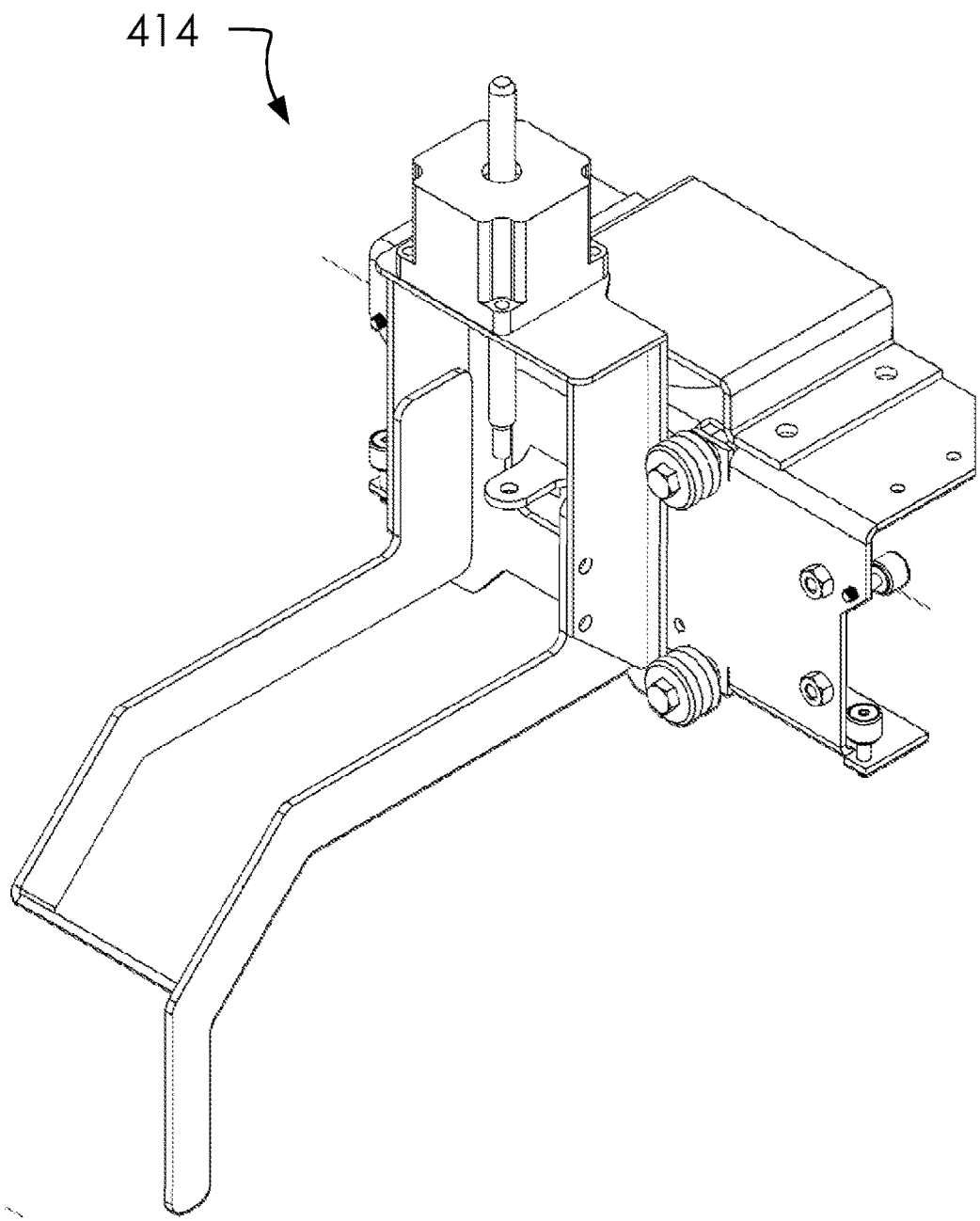
FIG. 14 illustrates a second front perspective overview of said second side height 414 without said motor 1200.

FIG. 14 illustrates a second front perspective overview of said second side height 414 without said motor 1200.

Figure 15:
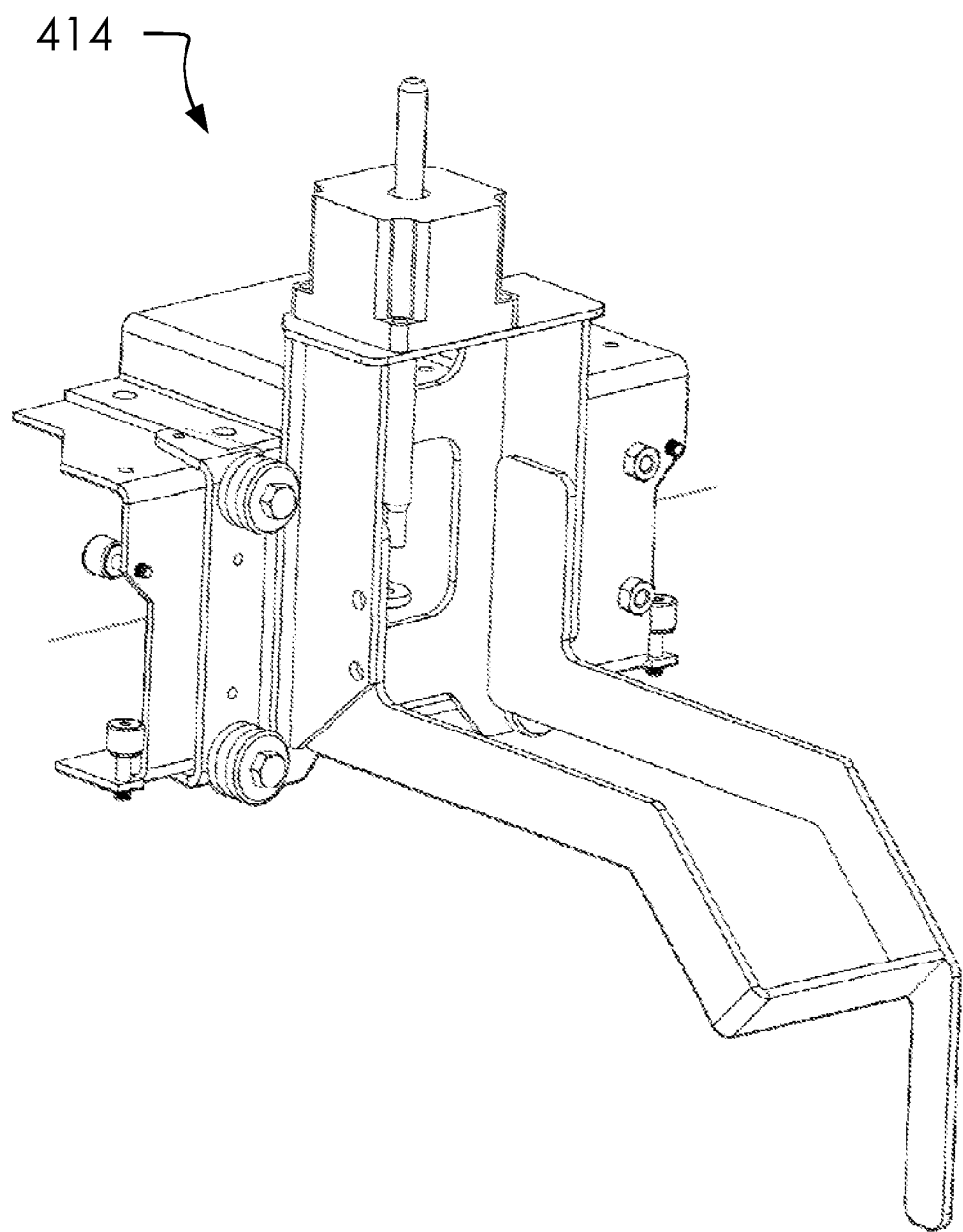
FIG. 15 illustrates a first front perspective overview of said second side height 414 without said motor 1200.

FIG. 15 illustrates a first front perspective overview of said second side height 414 without said motor 1200.

Figure 16:
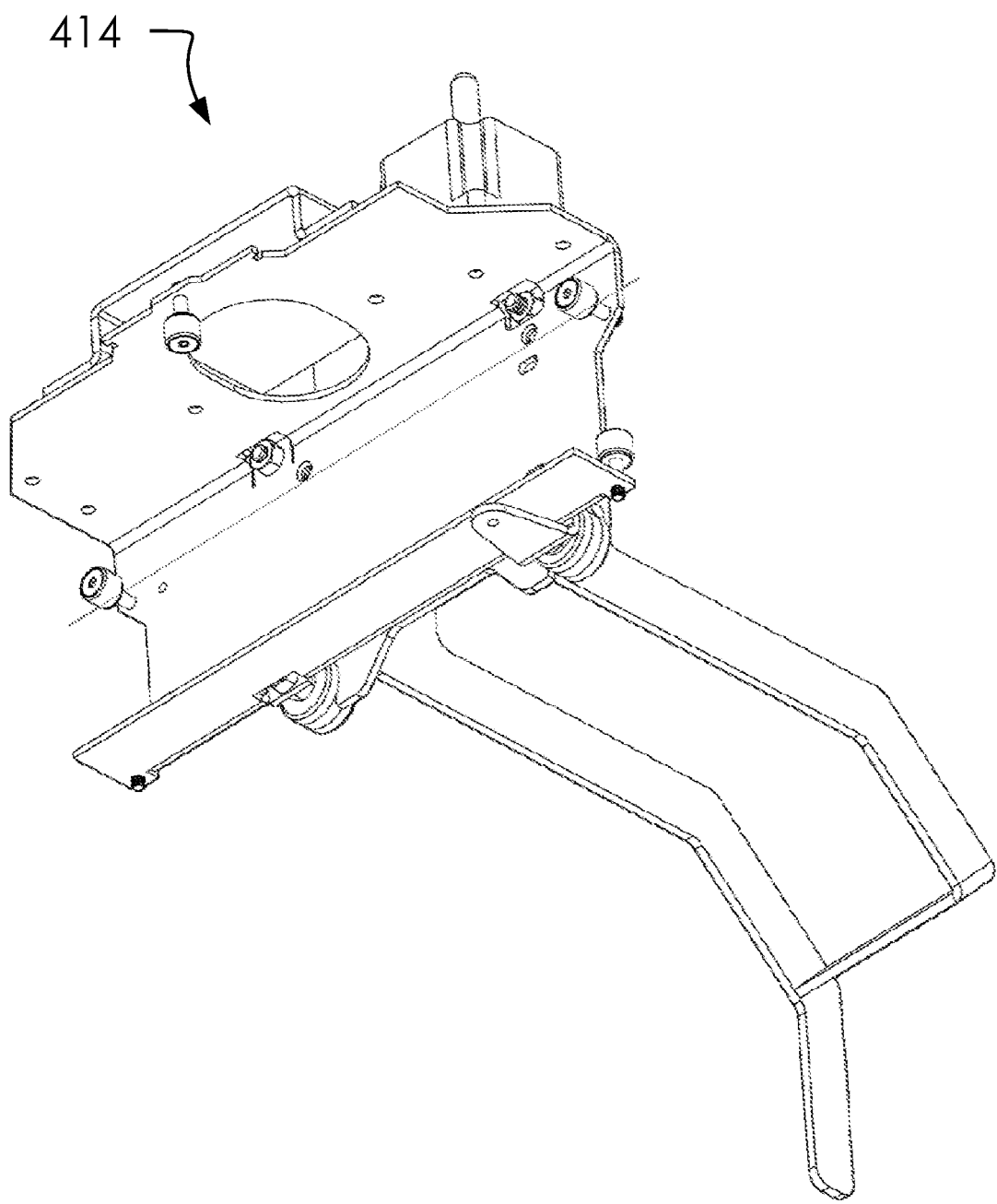
FIG. 16 illustrates a rear perspective overview of said second side height 414 without said motor 1200.

FIG. 16 illustrates a rear perspective overview of said second side height 414 without said motor 1200.

Figure 17A:
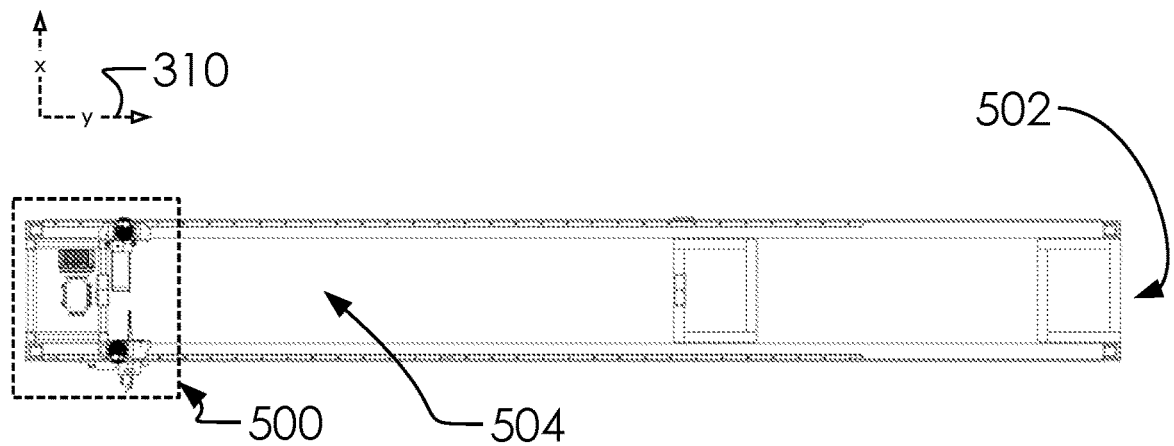
FIGS. 17A, and 17B illustrate an elevated top overview of said training system 400 and said first end 500 of said training system 400.
Figure 17B:
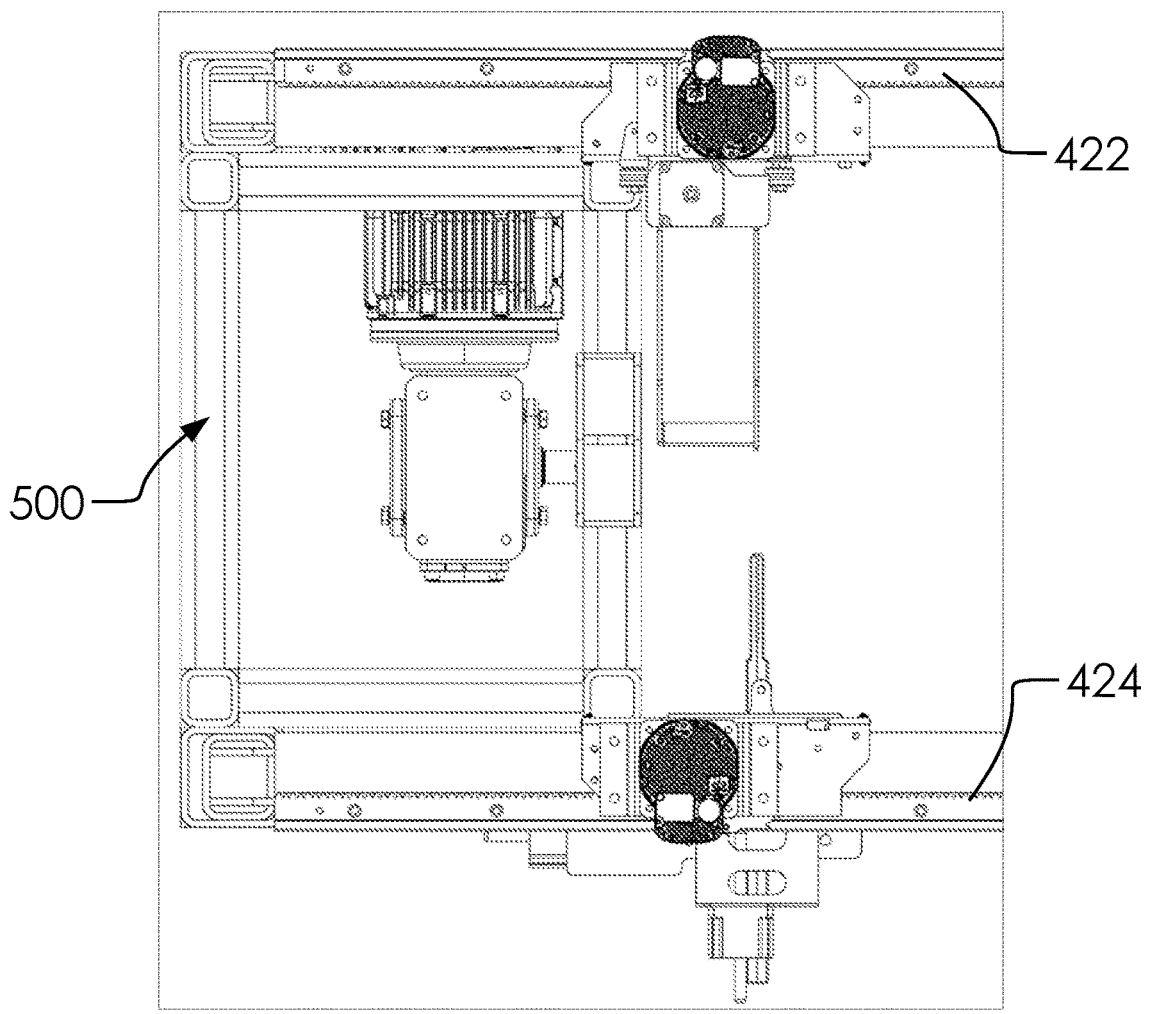

FIGS. 17A, and 17B illustrate an elevated top overview of said training system 400 and said first end 500 of said training system 400.

In one embodiment, said spacing measurement assembly 416 and said training assembly 418 move within said y-axis 310 along said first track 422 and said second track 424, training of said plurality of blade disks 302 can begin at said first end 500 and proceed toward said second end 502.

Figure 18:
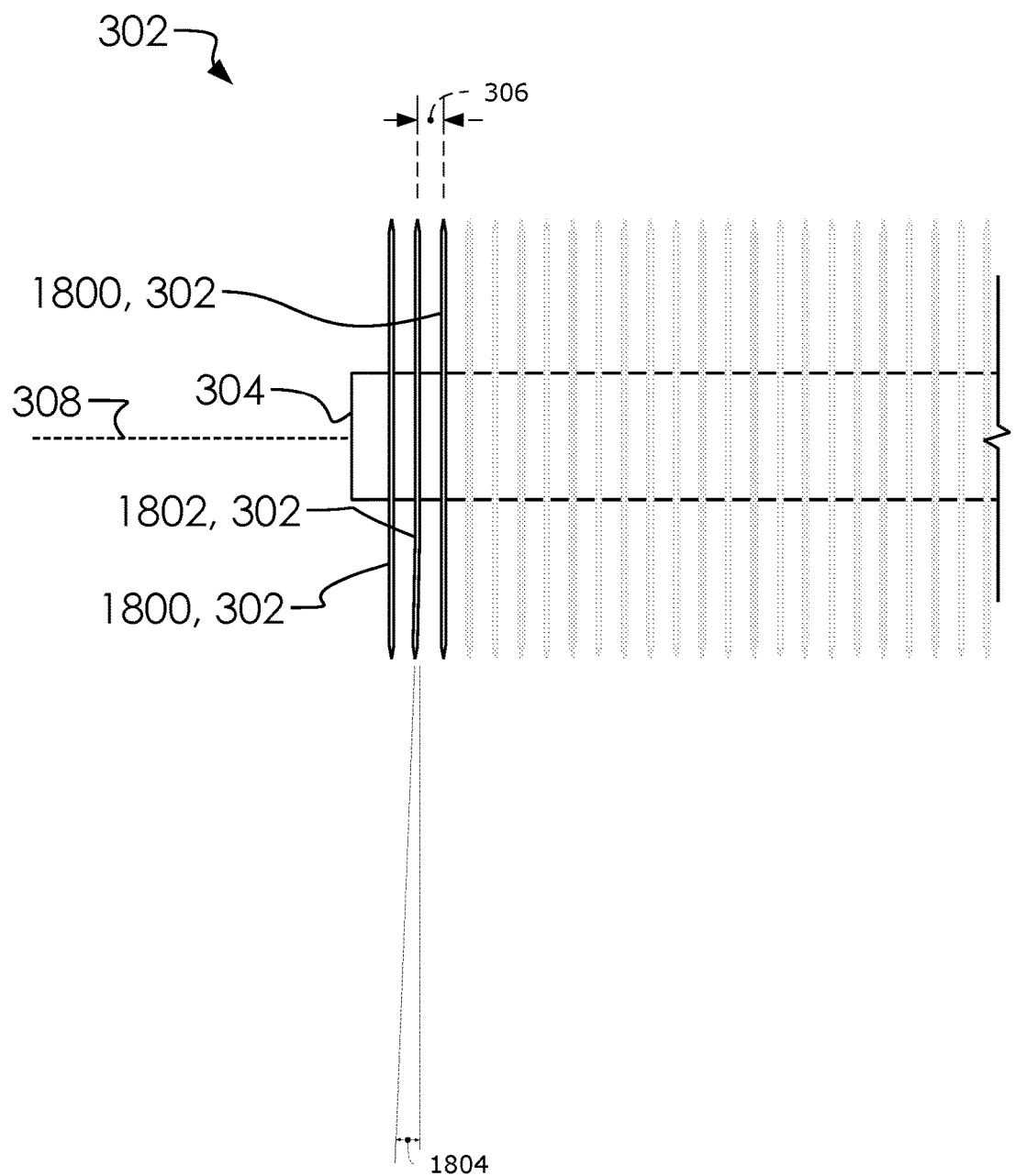
FIG. 18 illustrates an elevated detailed top view of said mandrel 300.

FIG. 18 illustrates an elevated detailed top view of said mandrel 300.

Said plurality of blade disks 302 can comprise one or more nominal disks 1800 and one or more misaligned disks 1802. One objective of said training system 400 is to locate and correct said one or more misaligned disks 1802 among said plurality of blade disks 302, and to validate said one or more nominal disks 1800 among said plurality of blade disks 302. For discussion purposes, said one or more misaligned disks 1802 can be out of alignment from nominal bent according to a bend angle 1804.

Although said bend angle 1804 may be very small, any deviation from nominal, that is a 0 degree or planar disk, can cause damage when said mandrel 300 is installed and spinning in a gin stand (not illustrated).

Figure 19:
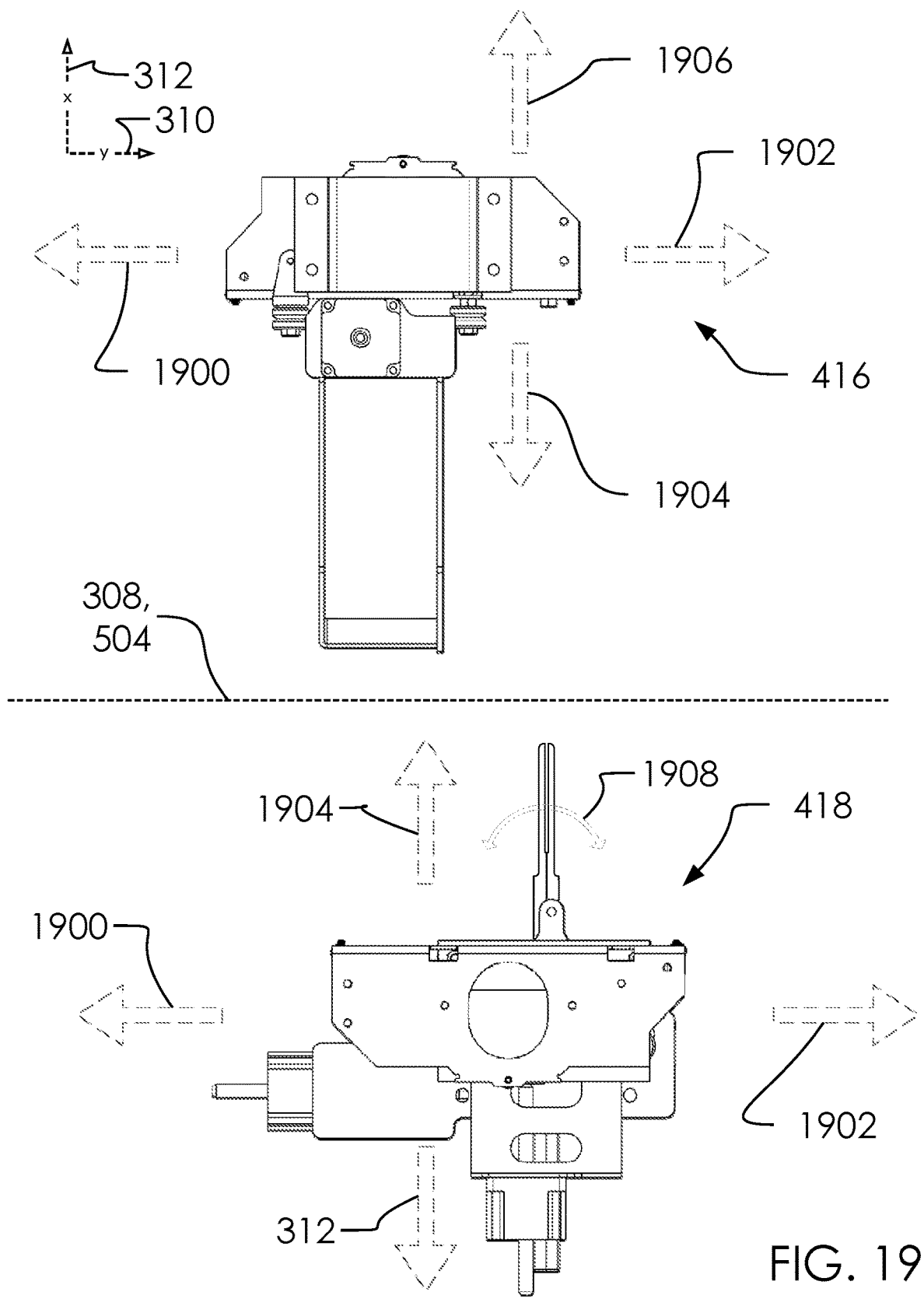
FIG. 19 illustrates an elevated top view of said spacing measurement assembly 416 and said training assembly 418.

FIG. 19 illustrates an elevated top view of said spacing measurement assembly 416 and said training assembly 418.

Said spacing measurement assembly 416 and said training assembly 418 can move in a toward first end direction 1900 or a toward second end direction 1902 within said y-axis 310; and in an inward direction 1904 or an outward direction 1906 in said x-axis 312 as related to said center axis 308. Said inward direction 1904 can be toward said central channel 504 and said outward direction 1906 can be away from said central channel 504. Said toward first end direction 1900 can be directed at said first end 500 and said toward second end direction 1902 can be toward said second end 502.

As discussed above, said training arm 810 can rotate about said pivoting axis 1012, which is illustrated as a training pivoting motion 1908.

Figure 20:
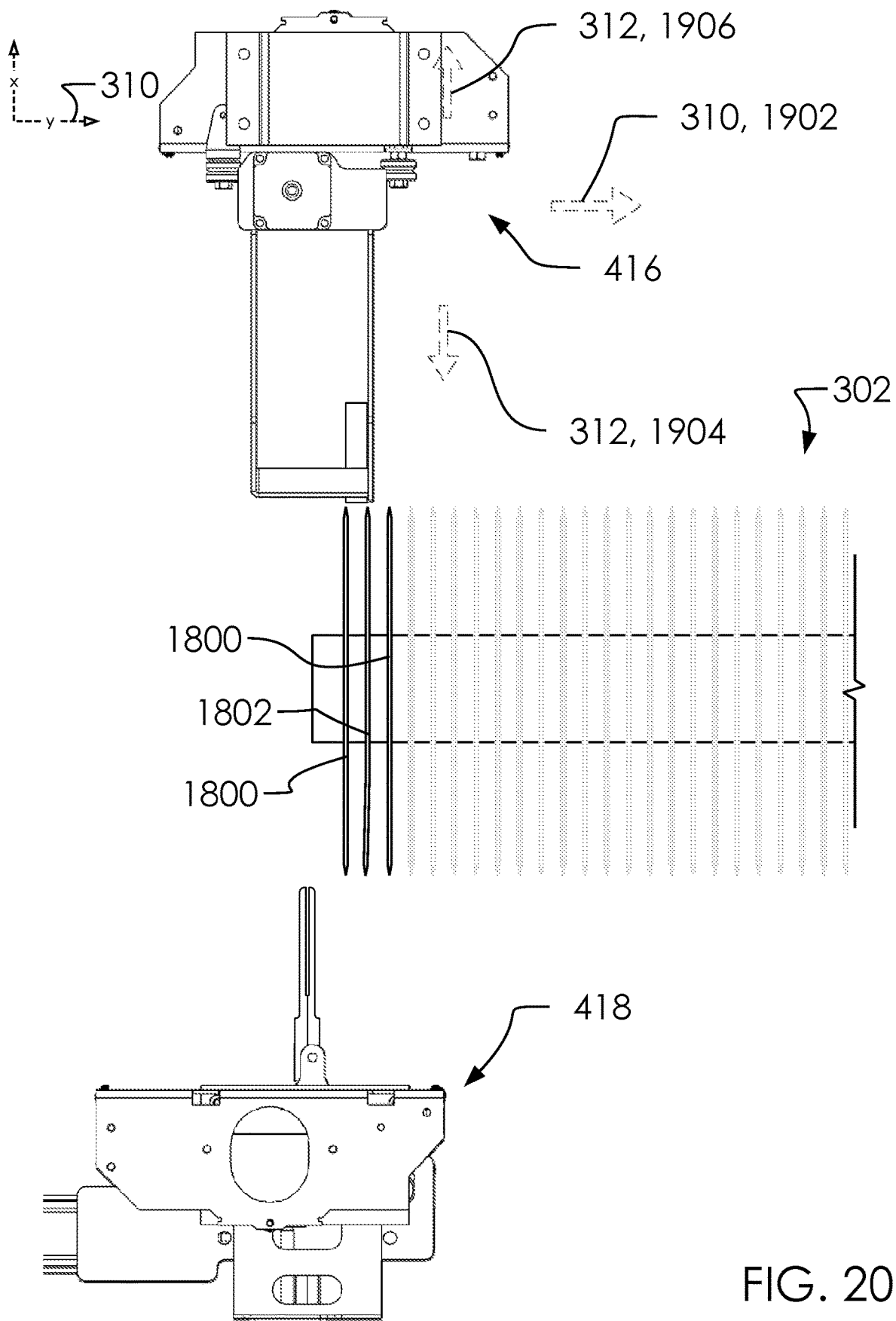
FIG. 20 illustrates an elevated top view of said spacing measurement assembly 416 and said training assembly 418 with a plurality of blade disks 302.

FIG. 20 illustrates an elevated top view of said spacing measurement assembly 416 and said training assembly 418 with said plurality of blade disks 302.

In one embodiment, said training system 400 can comprise a method of training disks 2000 using said training system 400 comprising assessing said plurality of blade disks 302 as between said one or more nominal disks 1800 and said one or more misaligned disks 1802 by: measuring each among said plurality of blade disks 302 using said spacing measurement assembly 416 and bending said one or more misaligned disks 1802 to conform with a standard associated with said one or more nominal disks 1800. In one embodiment, measuring each among said plurality of blade disks 302 can comprise: aligning said laser distance measurement system 1300 with each among said plurality of blade disks 302, rotating said mandrel 300, measuring characteristics of each said plurality of blade disks 302.

Figure 21:
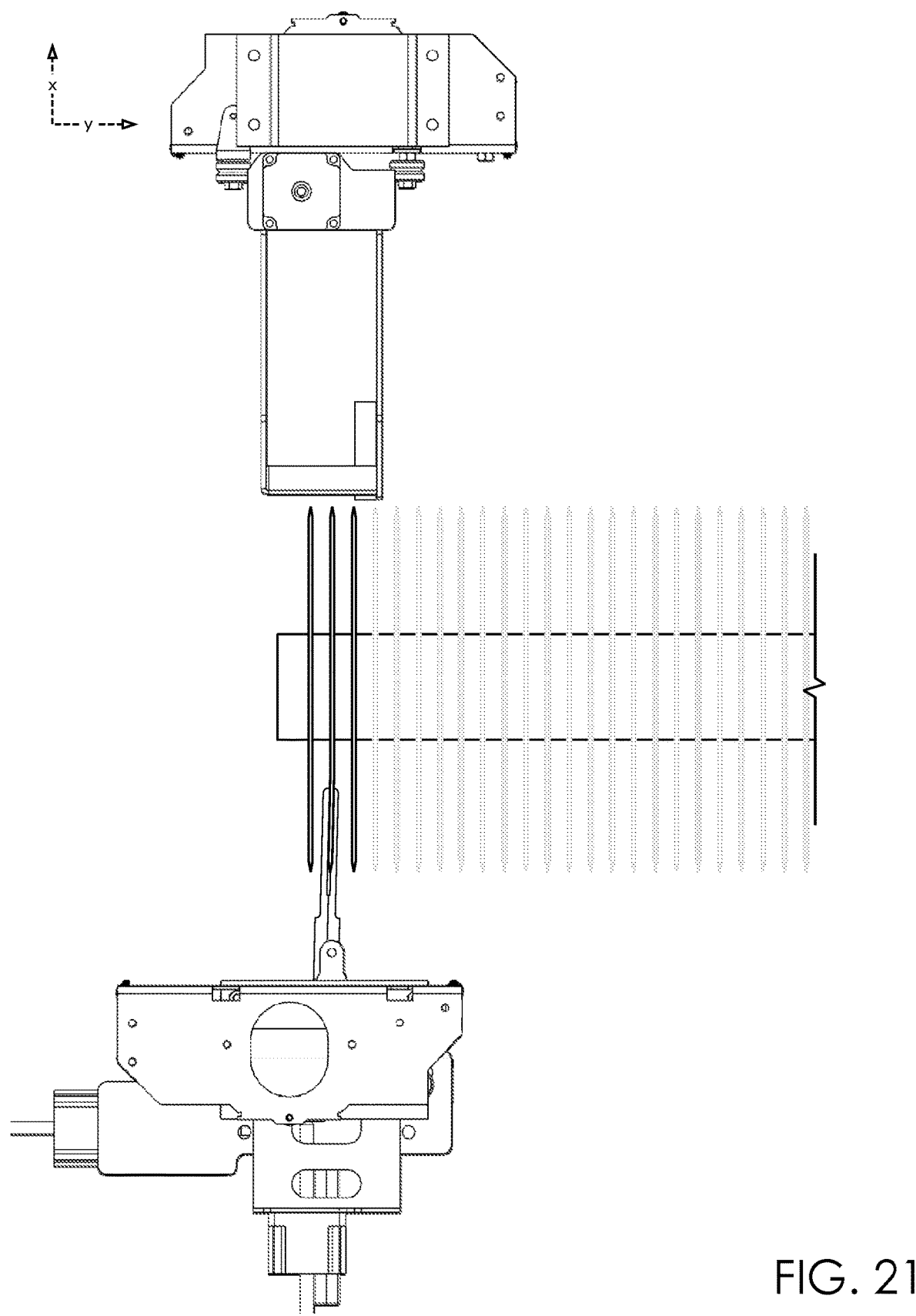
FIG. 21 illustrates an elevated top view of said spacing measurement assembly 416 and said training assembly 418 with said plurality of blade disks 302.

FIG. 21 illustrates an elevated top view of said spacing measurement assembly 416 and said training assembly 418 with said plurality of blade disks 302.

In one embodiment, bending said one or more misaligned disks 1802 can comprise sliding said training arm 810 around a portion of said one or more misaligned disks 1802 comprising said bend angle 1804, pressing said training arm 810 to straighten each among said one or more misaligned disks 1802. In one embodiment, said training system 400 can assess each among said plurality of blade disks 302 individually with said spacing measurement assembly 416 and said training assembly 418. In one embodiment, said spacing measurement assembly 416 and said training assembly 418 can operate independently of one another to allow assessment and correction along said plurality of blade disks 302 with fewer bottlenecks.

Figure 22:
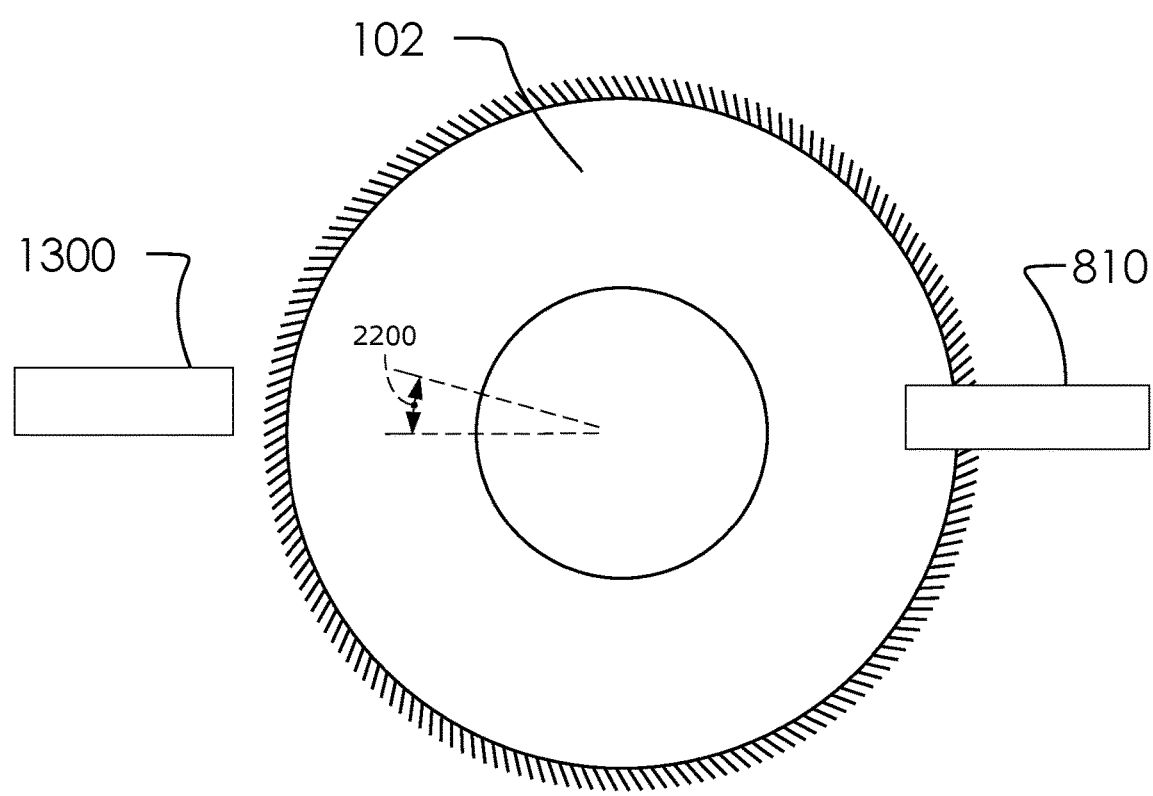
FIG. 22 illustrates an elevated side view of said blade disk 102 with a laser distance measurement system 1300 and said training arm 810.

FIG. 22 illustrates an elevated side view of said blade disk 102 with said laser distance measurement system 1300 and said training arm 810.

In one embodiment, said training system 400 can be programmed to take measurements of said blade disk 102 at various points by taking a measurement, rotating a rotary step 2200 around said center point 118, taking additional readings, and repeating at least one time around 360 degrees. In one embodiment, said training system 400 can rotate said blade disk 102 around 3 times to ensure a complete and accurate reading of defects in said blade disk 102. In one embodiment, said rotary step 2200 can comprise 18 degrees.

In one embodiment, said training arm 810 can correct said blade disk 102 of defects while said laser distance measurement system 1300 measures the quality of corrections made to said blade disk 102.

Figure 23:
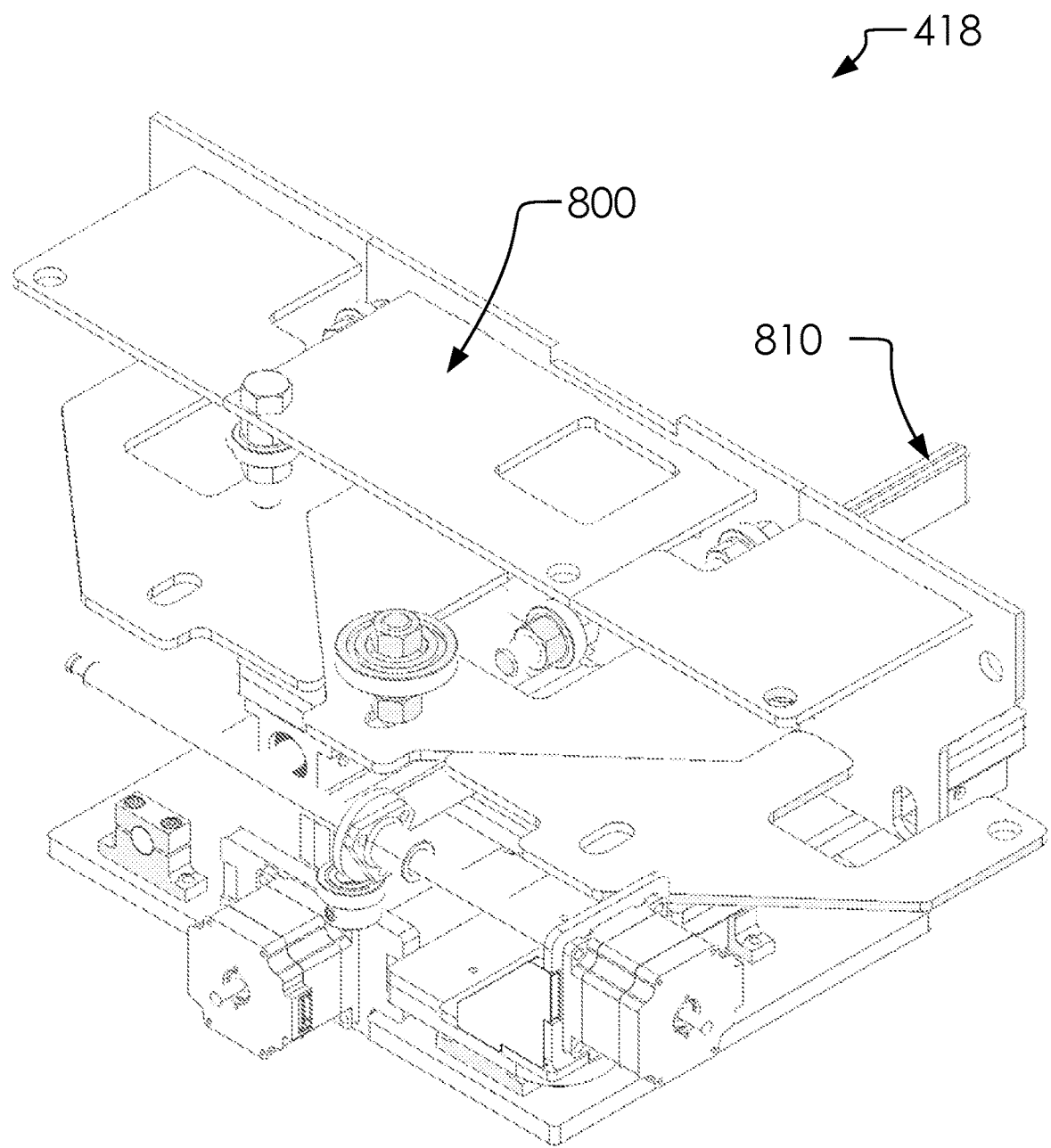
FIGS. 23-25 illustrates a perspective overview of said training assembly 418.
Figure 24:
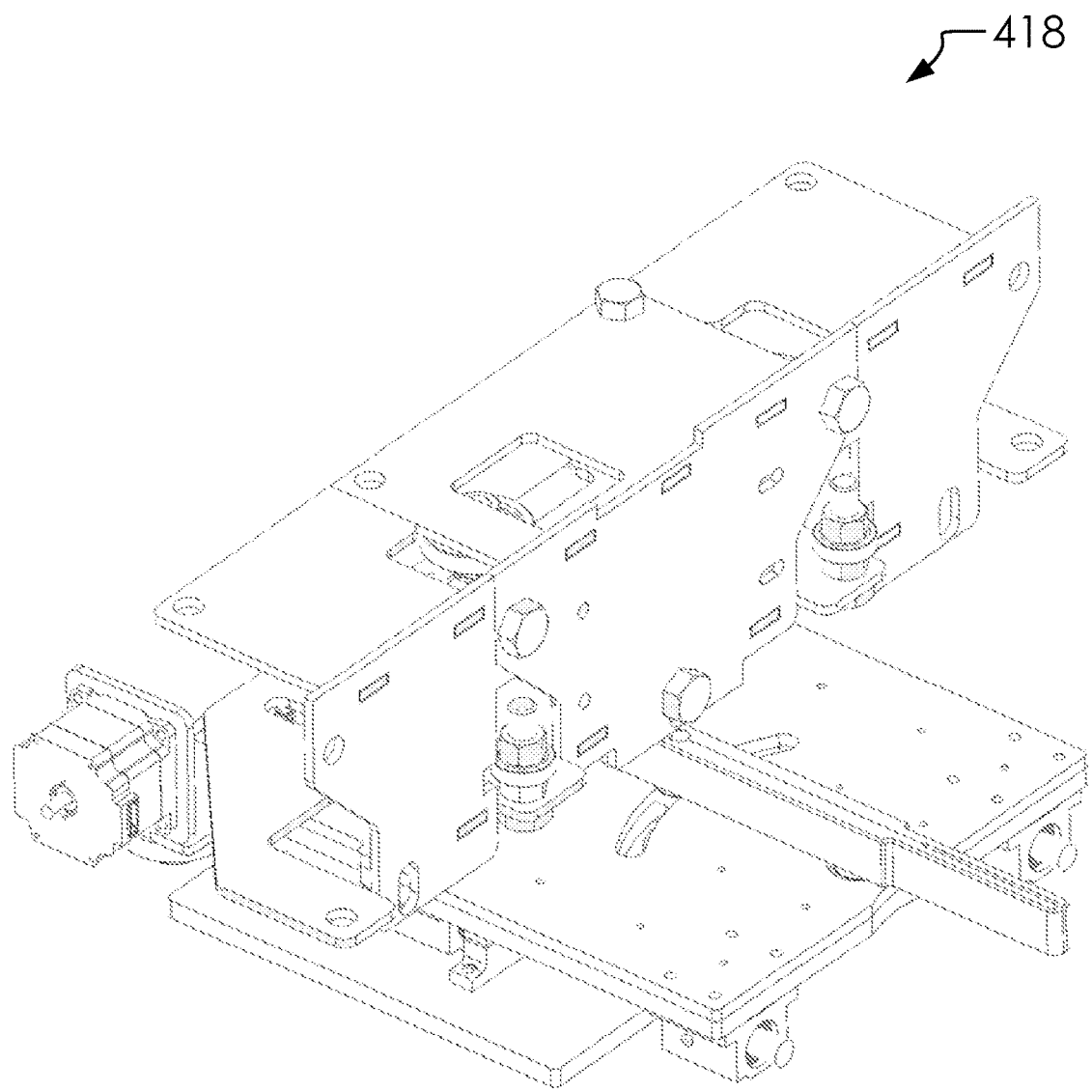
Figure 25:
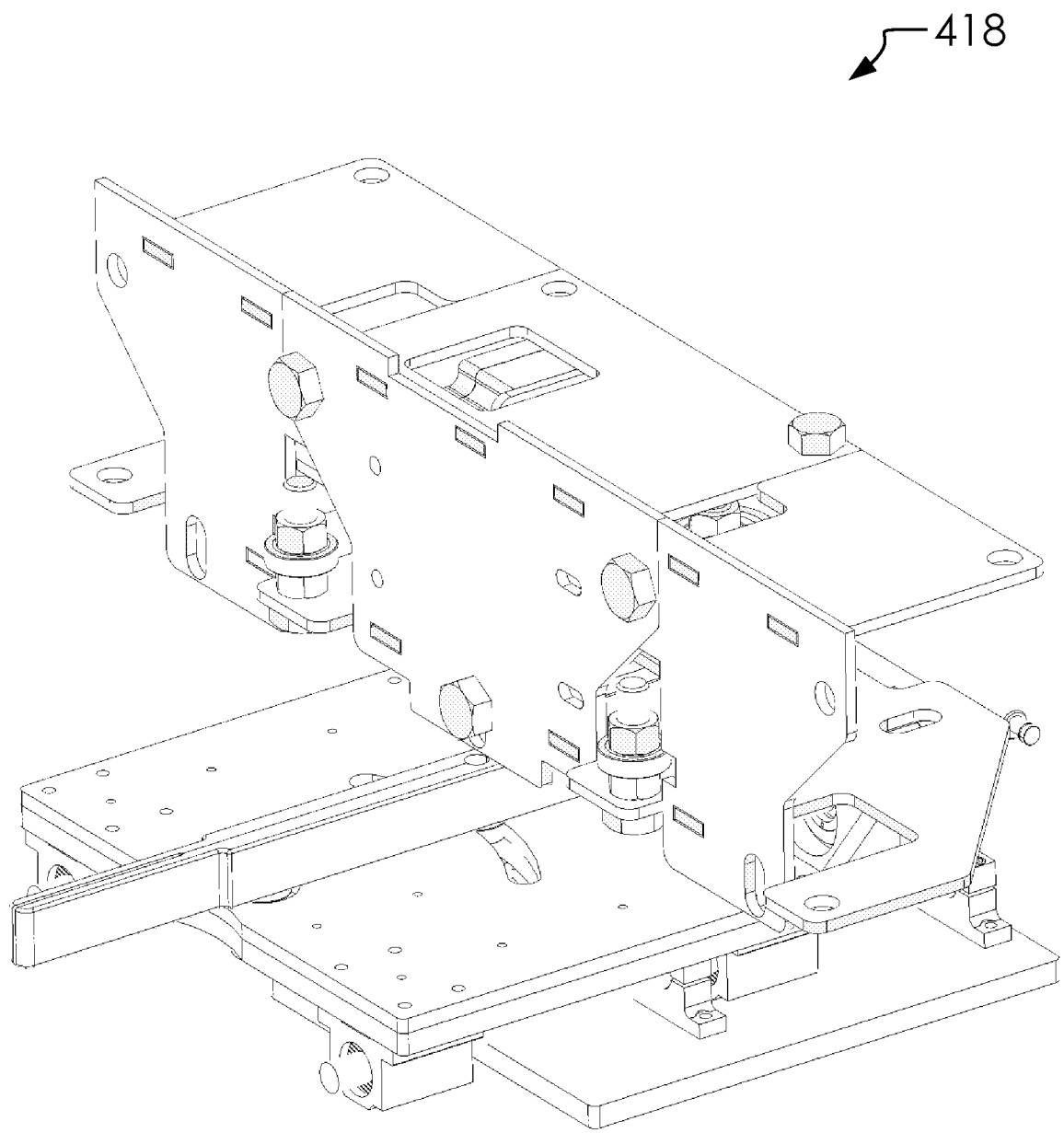

FIG. 23-25 illustrates a perspective overview of said training assembly 418.

As illustrated, in one embodiment, said training assembly 418 can comprise a variation on said upper portion 800, said lower portion 802, said plurality of y-axis wheels 804, said plurality of x-axis wheels 806, said motor mount 808 and said training arm 810. Wherein, said variations can be made to improve resiliency of said training assembly 418 and improve strength while bending said plurality of blade disks 302, as discussed above.

Figure 26:
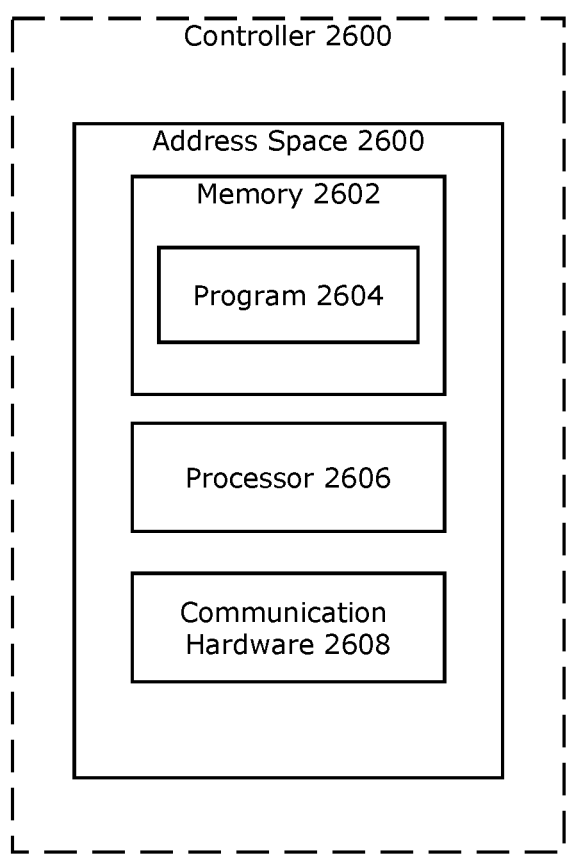
FIG. 26 illustrates an address space 2600 of a controller 508.

FIG. 26 illustrates an address space 2600 of said controller 508.

In one embodiment, said address space 2600 can comprise a memory 2602 having a program 2604, one or more processors 2606, and a communication hardware 2608. In one embodiment, said program 2604 can control functions of said training system 400, such as analysis and correction of said one or more misaligned disks 1802.

Figure 27:
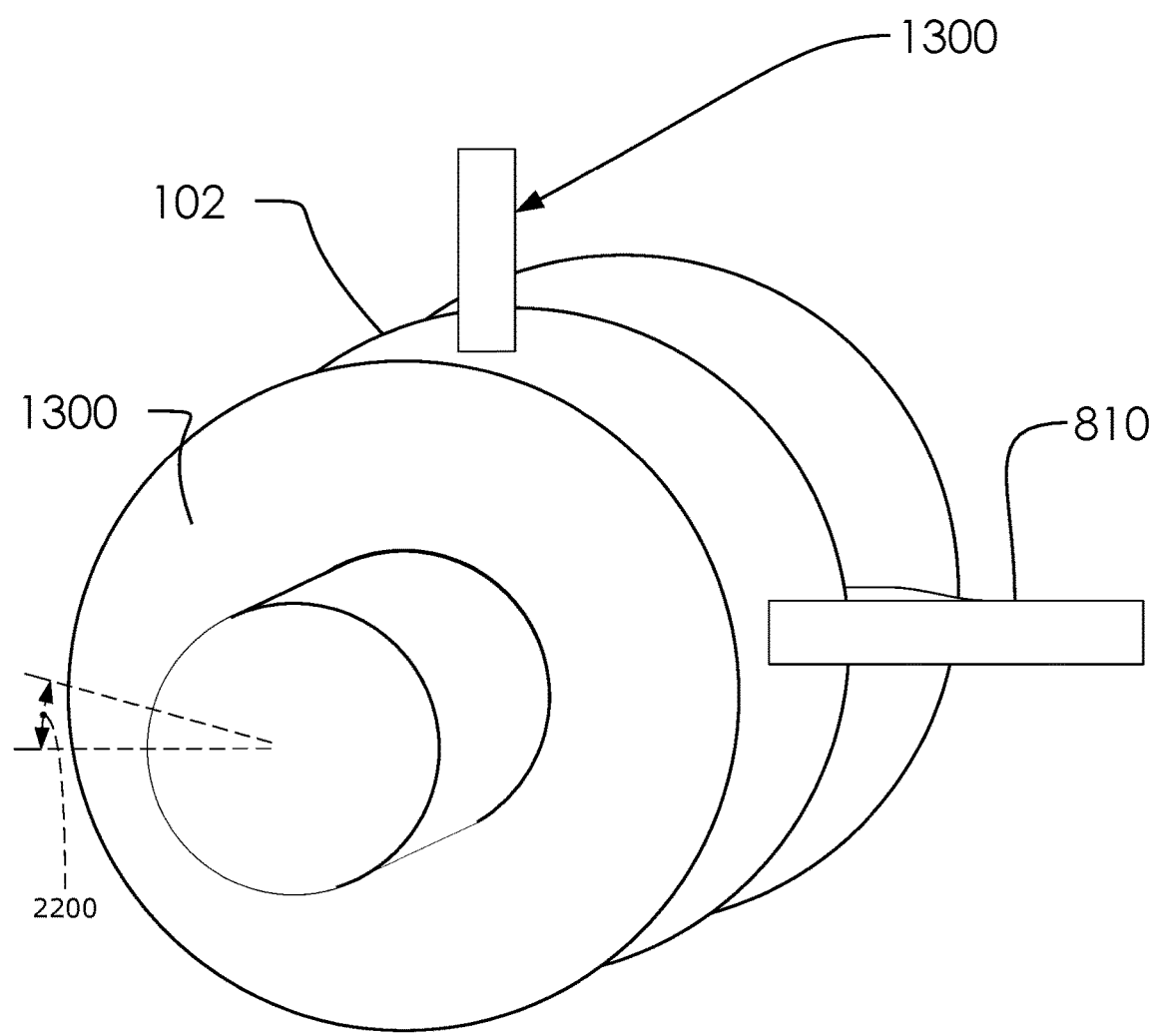
FIG. 27 illustrates an elevated view of a portion of said plurality of blade disks 302 on said mandrel 300 with said laser distance measurement system 1300 and said training arm 810.

FIG. 27 illustrates an elevated view of a portion of said plurality of blade disks 302 on said mandrel 300 with said laser distance measurement system 1300 and said training arm 810.

In one embodiment, a portion of said laser distance measurement system 1300 can be arranged at a top center location relative to said center axis 308, and said training arm 810 can be at a 90 degree clockwise location relative to said laser distance measurement system 1300, as illustrated. For example, said rotary step 2200 can comprise 20 rotations per full rotation of said blade disk 102, or 18 degrees per turn.

Figure 28:
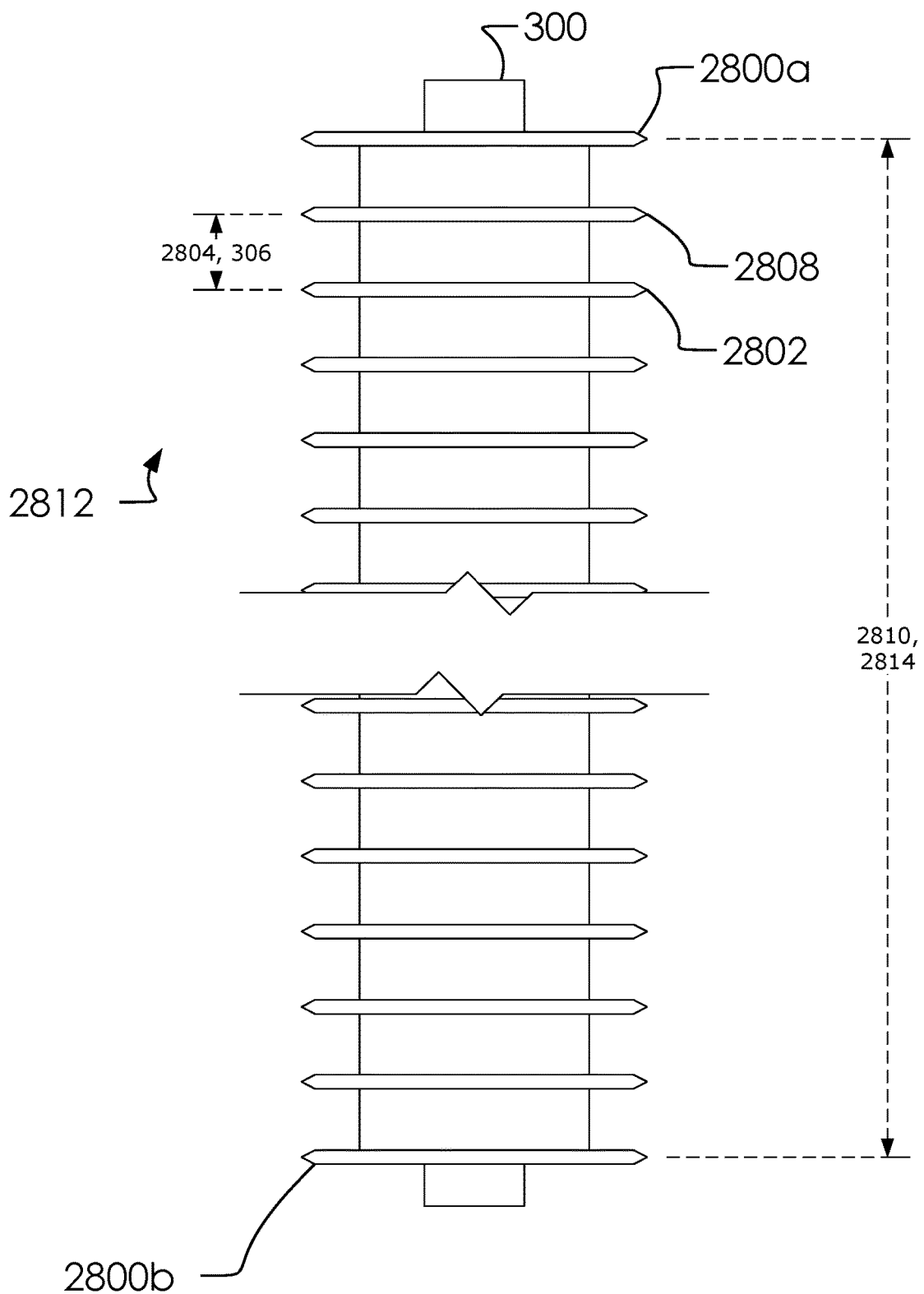
FIG. 28 illustrates an elevated side view of said mandrel 300 with said plurality of blade disks 302.

FIG. 28 illustrates an elevated side view of said mandrel 300 with said plurality of blade disks 302.

In one embodiment, said plurality of blade disks 302 can comprise a first disk 2800a and a last disk 2800b.

As said training system 400 is configured for measuring said outer edge 120 of a current disk 2802 at a plurality of rotary locations, and for calculating a correction delta 2806 of said specified separation distance 306 less a current separation distance 2804. Further, said training system 400 can be configured to bend said current disk 2802 to eliminate said correction delta 2806 as between said current disk 2802 and an adjacent disk 2808.

In one embodiment, said training system 400 is configured for measuring a total saw width 2810 comprising a distance between said first disk 2800a and said last disk 2800b. In one embodiment, said training system 400 can confirm that said total saw width 2810 is equal to a nominal saw length equal to the desired location of said first disk 2800a and said last disk 2800b.

In one embodiment, said training system 400 can confirm and alter said plurality of blade disks 302 according to a blade spacing specification 2812. Wherein, said blade spacing specification 2812 can comprise said total saw width 2810 between said first disk 2800a and said last disk 2800b comprises a specified saw width 2814, and each adjacent disk among said plurality of blade disks 302 being spaced by said specified separation distance 306.

In one embodiment, said program 2604 can be configured for measuring said outer edge 120 in increments of said rotary step 2200, recording said current separation distance 2804 at each among said rotary step 2200, and bending said current disk 2802 at each said rotary step 2200 according to said bend angle 1804 for each among said rotary step 2200.

In one embodiment, said training system 400 can be configured for measuring each among said plurality of blade disks 302 at each among said rotary step 2200, and correcting any misalignments found according to said blade spacing specification 2812.

Figure 29:
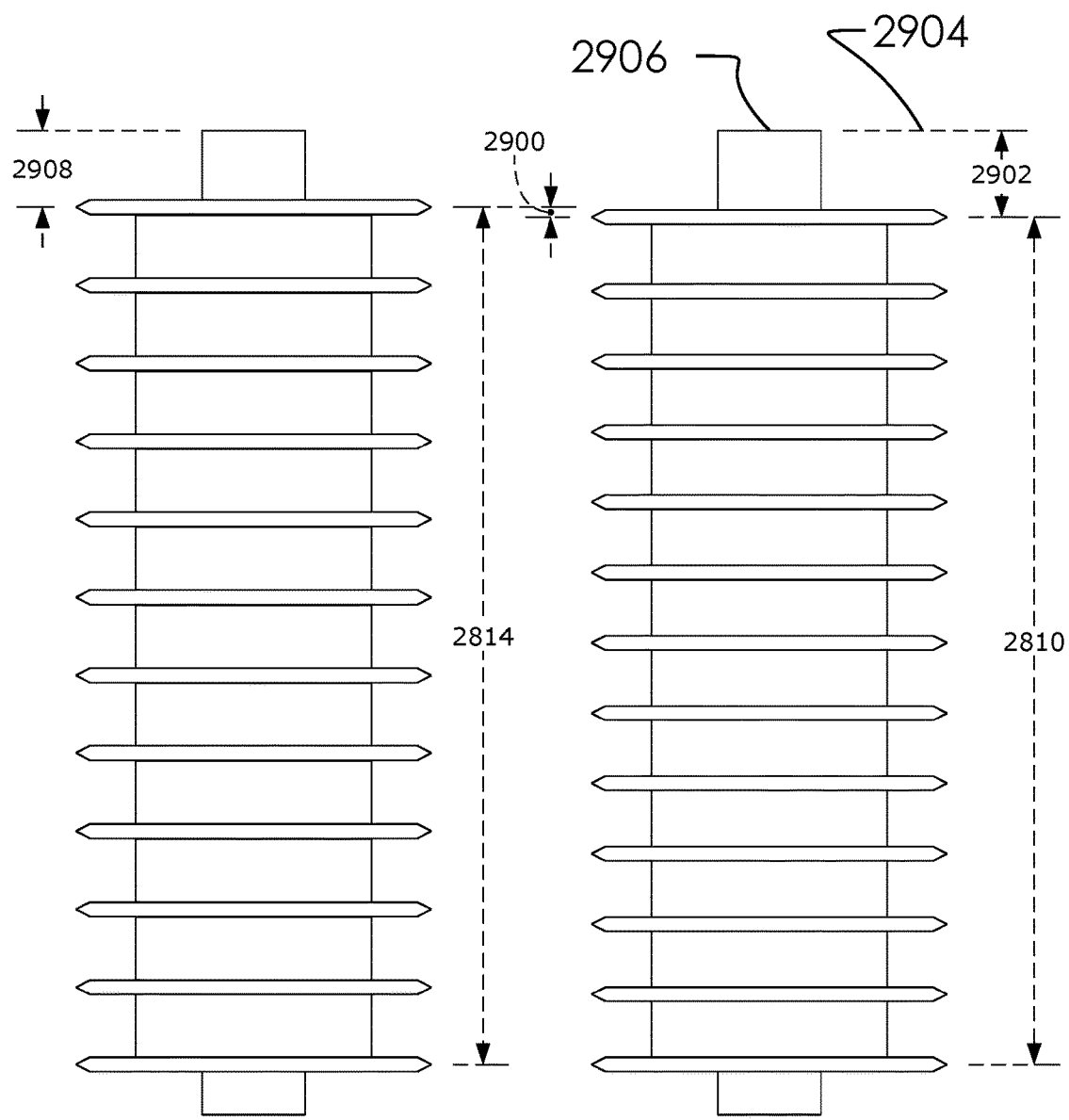
FIG. 29 illustrates said plurality of blade disks 302 with a specified saw width 2814 and a total saw width 2810.

FIG. 29 illustrates said plurality of blade disks 302 with said specified saw width 2814 and said total saw width 2810.

In one embodiment, it can be advantageous to minimize bending on said plurality of blade disks 302 by ensuring that corrections according to said blade spacing specification 2812 are evenly distributed among said plurality of blade disks 302. For example, if slight changes are applied to disks proximate to said first disk 2800a, it might be that large changes may need to be applied to disks proximate to said last disk 2800b. Accordingly, said training system 400 and said program 2604 can be configured to calculate a portion of said plurality of blade disks 302 to be bent outward toward said first disk 2800a and a second portion to bent outward toward said last disk 2800b.

Where said total saw width 2810 and said specified saw width 2814 do not match, said program 2604 can calculate a saw width distance error 2900 between said total saw width 2810 and said specified saw width 2814, determine whether said saw width distance error 2900 exceeds said blade spacing specification 2812 and planning a correction for said plurality of blade disks 302.

In one embodiment, said training system 400 can be configured for calculating a starting offset 2902 from a home position 2904 at a first end 2906 of said mandrel 300. In one embodiment, said starting offset 2902 can comprise a default offset 2908 plus half of said saw width distance error 2900. Wherein, bending said first disk 2800a outward will result in said last disk 2800b bent outward as well; and, conversely, if said first disk 2800a is bent inward, said last disk 2800b will be bent inward as well. Whereby, said bend angle 1804 on each among said plurality of blade disks 302 is minimized and distributed more evenly among said plurality of blade disks 302.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The following paragraphs are included with reference to the claims and can be interpreted as a preferred embodiment.

The following listing of the parts in the figures is included for the convenience of the reader.

said blank 100,
Said blade disk 102,
Said body portion 104,
Said center aperture 106,
Said diameter 108,
Said center aperture diameter 122,
Said detailed call-out 110,
Said plurality of punched teeth 112,
Said sharpened edge 114,
Said tooth orientation 116,
Said center point 118,
Said outer edge 120,
Said unsharpened punched blank 124,
Said call-out 200,
Said grind angle 202,
Said top surface 204,
Said bottom surface 206,
Said mandrel 300,
Said plurality of blade disks 302,
Said center shaft 304,
Said specified separation distance 306,
Said center axis 308,
Said y-axis 310,
Said x-axis 312,
Said z-axis 314,
Said training system 400,
Said training stand 402,
Said first side 404,
Said second side 406,
Said width 408,
Said length 410,
Said first side height 412,
Said second side height 414,
Said spacing measurement assembly 416,
Said training assembly 418,
Said motor 420,
Said first track 422,
Said second track 424,
Said first end 500,
Said second end 502,
Said central channel 504,
Said trainer rotating axis 506,
Said controller 508,
Said motor 700,
Said linear slide assembly 702,
Said upper portion 800,
Said lower portion 802,
Said plurality of y-axis wheels 804,
Said plurality of x-axis wheels 806,
Said motor mount 808,
Said training arm 810,
Said mounting plate 1002,
Said bender mounting assembly 1000,
Said linear actuator 1004,
Said fastener aperture 1006,
Said first end 1008,
Said second end 1010,
Said pivoting axis 1012,
Said training adapter 1014,
Said slot 1016,
Said first side 1018,
Said second side 1020,
Said rod 1022,
Said fastener 1026,
Said arched aperture 1024,
Said side mounting bracket 1028,
Said motor 1200,
Said lower portion 1202,
Said upper portion 1204,
Said plurality of z-axis wheels 1206,
Said plurality of y-axis wheels 1208,
Said laser distance measurement system 1300,
Said one or more nominal disks 1800,
Said one or more misaligned disks 1802, Said bend angle 1804,
Said toward first end direction 1900,
Said toward second end direction 1902,
Said inward direction 1904,
Said outward direction 1906,
Said training pivoting motion 1908,
Said method of training disks 2000,
Said rotary step 2200,
Said address space 2600,
Said memory 2602,
Said program 2604,
Said one or more processors 2606,
Said communication hardware 2608,
Said first disk 2800*a*,
Said last disk 2800*b*,
Said current disk 2802,
Said correction delta 2806,
Said current separation distance 2804,
Said adjacent disk 2808,
Said total saw width 2810,
Said blade spacing specification 2812,
Said specified saw width 2814,
Said saw width distance error 2900,
Said starting offset 2902,
Said home position 2904,
Said first end 2906, and
Said default offset 2908.

The invention claimed is:

1. A training system for identifying one or more misaligned disks among a plurality of blade disks and straightening said one or more misaligned disks, wherein:
    said training system comprises a training stand, a width, a length, a spacing measurement assembly, a training assembly, and a controller;
    each among said plurality of blade disks comprise a blade disk having a body portion, a center aperture, a diameter, a plurality of punched teeth, a sharpened edge, a center point, an outer edge and a center aperture diameter;
    portions of said plurality of blade disks comprise said one or more misaligned disks and one or more nominal disks;
    said plurality of blade disks comprise at least a first disk and a last disk;
    each among said plurality of blade disks is attached to a mandrel along a center axis;
    said one or more nominal disks conform to a blade spacing specification comprising
        a total saw width between said first disk and said last disk,
        a specified saw width, and
        said outer edge of each disk among said plurality of blade disks spaced by a specified separation distance;
    said training stand is configured to hold said mandrel having said plurality of blade disks;
    said one or more nominal disks among said plurality of blade disks each comprise said outer edge being said specified separation distance from said outer edge of adjacent disks;
    said one or more misaligned disks among said plurality of blade disks each comprise a portion of said outer edge not being said specified separation distance from said outer edge of adjacent disks;
    said controller, for each among said plurality of blade disks, is configured for
        receiving a measurement of a current separation distance of said outer edge between a current disk and an adjacent disk from said spacing measurement assembly, and
        specifying whether said current disk comprises one among said one or more nominal disks or said one or more misaligned disks;
    if said current disk is among said one or more misaligned disks, said controller is further configured for
        calculating a bend angle to alter said current disk to match said current separation distance to said specified separation distance of said blade spacing specification, and
        controlling said training assembly to correct said one or more misaligned disks according to said bend angle;
    said training assembly comprises a motor, a linear slide assembly and a training arm;
    a portion of said linear slide assembly is configured to move said training assembly along a y-axis using a second track;
    said training assembly comprises an upper portion and a lower portion;
    said training assembly is configured to move along portions of said second track using a plurality of x-axis wheels for guidance; and
    said motor is configured to attach to said training assembly on a motor mount.

2. A training system for identifying one or more misaligned disks among a plurality of blade disks and straightening said one or more misaligned disks, wherein:
    said training system comprises a training stand, a width, a length, a spacing measurement assembly, a training assembly, and a controller;
    each among said plurality of blade disks comprise a blade disk having a body portion, a center aperture, a diameter, a plurality of punched teeth, a sharpened edge, a center point, an outer edge and a center aperture diameter;
    portions of said plurality of blade disks comprise said one or more misaligned disks and one or more nominal disks;
    said plurality of blade disks comprise at least a first disk and a last disk;
    each among said plurality of blade disks is attached to a mandrel along a center axis;
    said one or more nominal disks conform to a blade spacing specification comprising
        a total saw width between said first disk and said last disk,
        a specified saw width, and
        said outer edge of each disk among said plurality of blade disks spaced by a specified separation distance;
    said training stand is configured to hold said mandrel having said plurality of blade disks;
    said one or more nominal disks among said plurality of blade disks each comprise said outer edge being said specified separation distance from said outer edge of adjacent disks;
    said one or more misaligned disks among said plurality of blade disks each comprise a portion of said outer edge not being said specified separation distance from said outer edge of adjacent disks;
    said controller, for each among said plurality of blade disks, is configured for receiving a measurement of a current separation distance of said outer edge between a current disk and an adjacent disk from said spacing measurement assembly, and specifying whether said current disk comprises one among said one or more nominal disks or said one or more misaligned disks; and if said current disk is among said one or more misaligned disks, said controller is further configured for calculating a bend angle to alter said current disk to match said current separation distance to said specified separation distance of said blade spacing specification, and controlling said training assembly to correct said one or more misaligned disks according to said bend angle.

3. The training system of claim 2, wherein:

it is advantageous to minimize bending on said plurality of blade disks by ensuring that corrections according to said blade spacing specification are evenly distributed among said plurality of blade disks;

said training system and a program is configured to calculate a portion of said plurality of blade disks to be bent outward toward said first disk and a second portion to bent outward toward said last disk;

where said total saw width and said specified saw width do not match, said program calculates a saw width distance error between said total saw width and said specified saw width, determines whether said saw width distance error exceeds said blade spacing specification and planning a correction for said plurality of blade disks;

said training system is configured for calculating a starting offset from a home position at a first end of said mandrel;

said starting offset comprises a default offset plus half of said saw width distance error;

wherein, bending said first disk outward will result in said last disk bent outward as well; and, conversely, if said first disk is bent inward, said last disk will be bent inward as well; and whereby, said bend angle on each among said plurality of blade disks is minimized and distributed more evenly among said plurality of blade disks.

4. The training system of claim 2, wherein:

said training system is configured for measuring, confirming and correcting each among said plurality of blade disks according to said blade spacing specification, comprising a substantially planar shape within an x-axis and a z-axis by holding said mandrel on said training stand, moving said spacing measurement assembly and said training assembly along a y-axis, measuring said specified separation distance between said plurality of blade disks, identifying a bent portion of a current blade disk among said plurality of blade disks, and bending said current blade disk with said training assembly to conform to said desired disk configuration.

5. The training system of claim 2, wherein:

a blank is punched to create said blade disk with said plurality of punched teeth and said sharpened edge; and said plurality of punched teeth are aligned in a tooth orientation being relative to said center point of said body portion and on said outer edge of said body portion.

6. The training system of claim 2, wherein:

said mandrel comprises said plurality of blade disks attached to a center shaft;

said training system comprises a central channel;

said mandrel is mounted between a first end and a second end within said central channel;

said central channel comprises a trainer rotating axis; and with said mandrel installed into said training system, said center axis and said trainer rotating axis are aligned.

7. The training system of claim 2, wherein:

said training assembly comprises a motor, a linear slide assembly and a training arm; and a portion of said linear slide assembly is configured to move said training assembly along a y-axis using a second track.

8. The training system of claim 7, wherein:

said training assembly comprises an upper portion and a lower portion;

said training assembly is configured to move along portions of said second track using a plurality of x-axis wheels for guidance; and said motor is configured to attach to said training assembly on a motor mount.

9. The training system of claim 8, wherein:

said lower portion and said upper portion are configured to move relative to one another in said x-axis by applying pressure and rolling along a plurality of y-axis wheels.

10. The training system of claim 2, wherein:

said training assembly is configured to adjust a portion of said plurality of blade disks by:

calculating a proper alignment of said plurality of blade disks, aligning a training adapter with one among said plurality of blade disks, activating a linear actuator, moving said training arm about a pivoting axis, and bending a portion of said plurality of blade disks according to said desired disk configuration.

11. A method of training disks using a training system comprising:

with a controller having a program executed in one or more processors:

receiving a measurement of a current separation distance of an outer edge between a current disk and an adjacent disk from a spacing measurement assembly, specifying whether said current disk comprises one among one or more nominal disks or one or more misaligned disks;

if said current disk is among said one or more misaligned disks, said controller is further configured for calculating a bend angle to alter said current disk to match said current separation distance to a specified separation distance of a blade spacing specification controlling a training assembly to correct said one or more misaligned disks according to said bend angle;

wherein, said training system comprises a training stand, a width, a length, said spacing measurement assembly, said training assembly, and said controller;

each among a plurality of blade disks comprise a blade disk having a body portion, a center aperture, a diameter, a plurality of punched teeth, a sharpened edge, a center point, said outer edge and a center aperture diameter;

portions of said plurality of blade disks comprises said one or more misaligned disks and said one or more nominal disks;

said plurality of blade disks comprise at least a first disk and a last disk;
each among said plurality of blade disks is attached to a mandrel along a center axis;
said one or more nominal disks conform to said blade spacing specification comprising
   a total saw width between said first disk and said last disk,
   a specified saw width, and
   said outer edge of each disk among said plurality of blade disks spaced by said specified separation distance;
said training stand is configured to hold said mandrel having said plurality of blade disks;
said one or more nominal disks among said plurality of blade disks each comprise said outer edge being said specified separation distance from said outer edge of adjacent disks; and
said one or more misaligned disks among said plurality of blade disks each comprise a portion of said outer edge not being said specified separation distance from said outer edge of adjacent disks.

12. The method of training disks of claim 11, wherein:
said program is configured for
   measuring said outer edge in increments of a rotary step,
   recording said current separation distance at each among said rotary step, and
   bending said current disk at each said rotary step according to said bend angle for each among said rotary step.

13. The method of training disks of claim 11, further comprising:
   calculating a proper alignment of said plurality of blade disks,
   aligning a training adapter with one among said plurality of blade disks,
   activating a linear actuator,
   moving a training arm about a pivoting axis, and
   bending a portion of said plurality of blade disks according to said desired disk configuration.

* * * * *